US012487125B2

(12) United States Patent
Smith

(10) Patent No.: US 12,487,125 B2
(45) Date of Patent: Dec. 2, 2025

(54) MATERIAL PROPERTY AND ENVIRONMENTAL CHARACTERIZATION BY PHOTODIODE SYSTEMS AND METHODS

(71) Applicant: Innogized Technologies, Inc., Cleveland, OH (US)

(72) Inventor: Oliver Smith, Chesterland, OH (US)

(73) Assignee: Innogized Technologies, Inc., Cleveland, OH (US)

( * ) Notice: Subject to any disclaimer, the term of this patent is extended or adjusted under 35 U.S.C. 154(b) by 339 days.

(21) Appl. No.: 18/193,884

(22) Filed: Mar. 31, 2023

(65) Prior Publication Data

US 2024/0328975 A1    Oct. 3, 2024

(51) Int. Cl.
*G01J 5/10* (2006.01)
(52) U.S. Cl.
CPC ........................................ *G01J 5/10* (2013.01)
(58) Field of Classification Search
CPC ........................................................ G01J 5/10
See application file for complete search history.

(56) References Cited

U.S. PATENT DOCUMENTS

| 2003/0101008 A1 | 5/2003 | Mansky |
| 2005/0200488 A1* | 9/2005 | Riley ................. G08B 21/0469 340/573.4 |
| 2011/0303022 A1 | 12/2011 | Hansma |

| 2013/0235207 A1* | 9/2013 | Lee ........................ G08B 21/24 348/152 |
| 2014/0247062 A1 | 9/2014 | Balthes |
| 2015/0150453 A1* | 6/2015 | Abreu .................... A61B 5/746 600/474 |

(Continued)

FOREIGN PATENT DOCUMENTS

| EP | 1065488 A1 | 1/2001 |
| IN | 201611014157 A | 10/2017 |

OTHER PUBLICATIONS

PCT Search Report dated Mar. 3, 2020 in connection with PCT Application No. PCT/US2019/059074.

(Continued)

*Primary Examiner* — Blake C Riddick
(74) *Attorney, Agent, or Firm* — Eschweiler & Potashnik, LLC

(57) ABSTRACT

Photodiode systems, methods, devices, and circuitries are provided for determining a material property and/or determining environmental characteristics. In one embodiment, a measurement device includes a first member, a second member rotatably coupled to the first member at a pivot that affixes the first member to the second member. The first member and the second member are configured to pivot between a closed position, where the first member and the second member contact one another, and an open position where the first member is rotatably separated from the second member. An infrared emitter is disposed within the first member, the infrared emitter faces the second member. An infrared sensor is disposed within the second member facing the first member, where when the first member and the second member are in the closed position, the infrared emitter and the infrared sensor are misaligned.

18 Claims, 9 Drawing Sheets

(56) References Cited

U.S. PATENT DOCUMENTS

| | | | |
|---|---|---|---|
| 2015/0253244 A1* | 9/2015 | Mander | G01N 21/59 |
| | | | 356/440 |
| 2016/0247273 A1* | 8/2016 | Fallgatter | G06F 18/24 |
| 2018/0080888 A1 | 3/2018 | Nazarian | |
| 2018/0144227 A1 | 5/2018 | Jesme | |
| 2021/0396694 A1* | 12/2021 | Smith | G01B 7/06 |

OTHER PUBLICATIONS

ATSM International; "Standard Test Method for Thermal Resistance of Batting Systems Using a Hot Plate"; Designation D1518-14; Published Nov. 29, 2018.

ATSM International; "Standard Test Method for Thickness of Textile Materials"; Designation; D1777-96 (Reapproved 2015); Published Apr. 12, 2019.

Hot Disk AB; "Hot Disk Thermal Conductivity Meter"; Hot Disk AB, Gothenburg Sweden; Published in 2019.

C-Therm Technologies; "Modified Transient Plane Source (MTPS): Theory of Operation"; Published in 2019.

Linesis Thermal Analytics; "Laser Flash Analysis"; Published Feb. 2019.

Saleem, Aamer et al.; "New Infrared Transmission through Various Clothing Fabrics" School of Engineering, University of Warwick; vol. 3, Issue 2; Published in 2013.

Potirakis, S.M.; "Acoustics and sound absorption issues applied in textile problems"; Electronics and Computing in Textiles; Chapter 4; Department of Electronics Engineering, Technological Education Institute of Piraeus, Greece; Published in 2012.

International Preliminary Report on Patentability dated Apr. 27, 2021 in connection with PCT Application No. PCT/US2019/059074.

* cited by examiner

MATERIAL PROPERTY AND
ENVIRONMENTAL CHARACTERIZATION
BY PHOTODIODE SYSTEMS AND
METHODS

STATEMENT UNDER 35 U.S.C. 202(c)(6)

This invention was made with Government support under Award Number 19134080 and Award Number 2051808 awarded by the National Science Foundation. The Government has certain rights to this invention.

BACKGROUND

Many materials are selected for specific applications based on their thermal properties, such as thermal resistance and thermal conductance. The thermal resistance of a material characterizes or quantifies the level of thermal insulation provided by the material. The thermal resistance of a material may be expressed in several ways, including "R-value," thermal insulance, or intrinsic thermal insulation (measured in meters squared Kelvin per Watt ($m^2K/W$)); absolute thermal resistance (measured in Kelvin per Watt (K/W)), or specific thermal resistance (measured in meters Kelvin per Watt (mK/W)). The thermal resistance of a material is an important characteristic when the material will be used in buildings or other structures, apparel, household goods, electronic devices, and so on.

DESCRIPTION

Figure 1A:
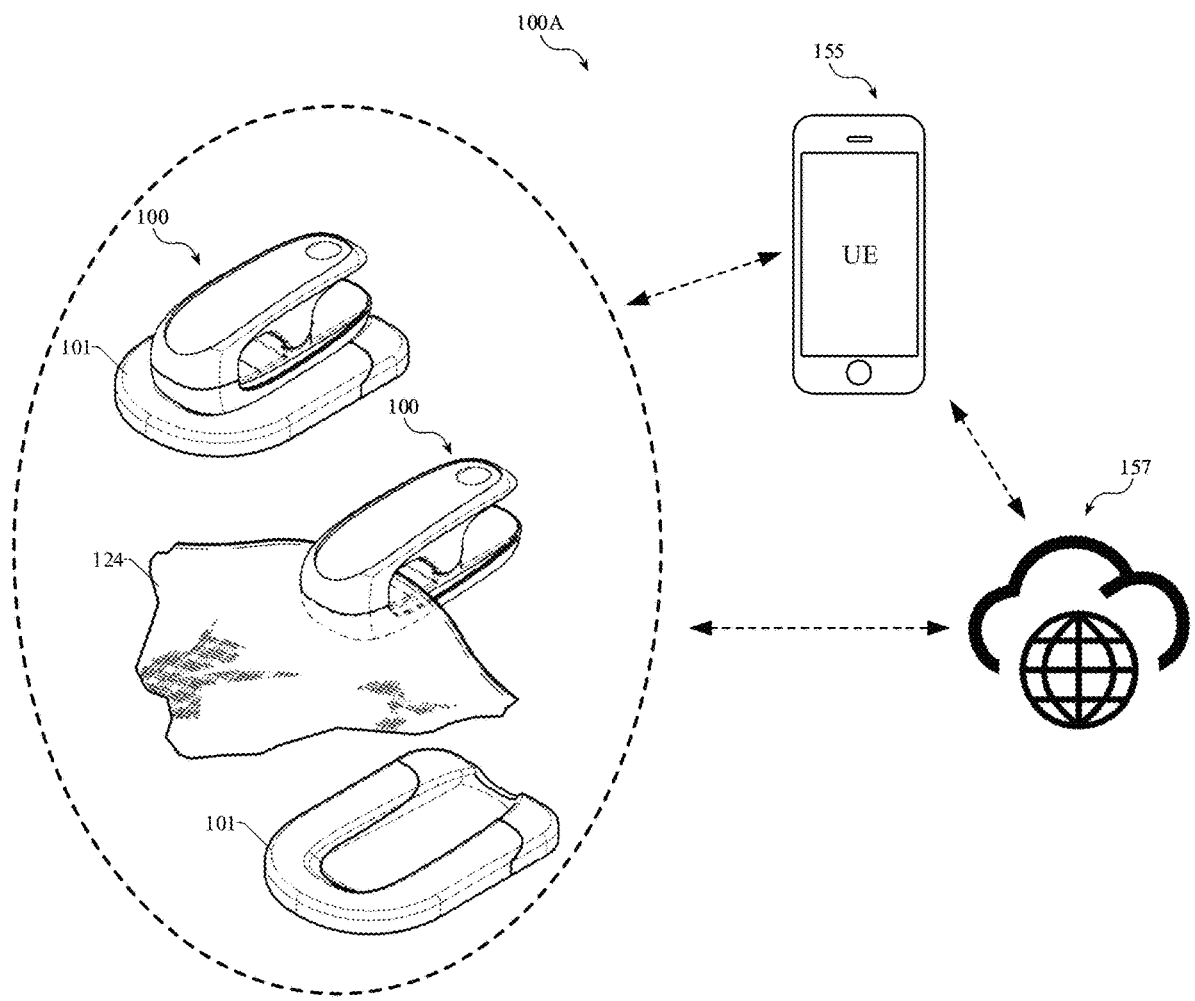
FIG. 1A illustrates an exemplary measurement system with a measurement device, a user equipment (UE), and/or cloud computing device that determines a thermal property of a material sample in accordance with various aspects described.

The determination of a material's thermal resistance is typically made in a laboratory environment using expensive and cumbersome test equipment and lengthy test procedures. However, in some circumstances a consumer or other non-technical person may want to determine or approximate a material's thermal resistance. Thermal resistance is a quantification of how difficult it is for heat to be passed (e.g., conducted, convected, radiated, etc.) between two points across a material (e.g., across a thickness of the material). For example, a person choosing a building material for a home project may be interested in determining the comparative thermal resistance of two different types of wall coverings. A person choosing camping gear may want to know the thermal resistance of a sleeping bag or coat they are considering purchasing. A parent choosing a garment for their baby may want to know the thermal resistance of different garments to maximize the baby's comfort. A person exercising or competing in a sport may want to know whether a garment is suitable for the environmental conditions. In the following description, the term "baby" can be used as a shorthand notation to refer to the person who is wearing a garment made of the material under test or material sample.

In addition to choosing a garment, determining that an environment is suitable for sleep is typically conducted qualitatively by an observational or perceived assessment of a space. That is, a caretaker may "feel" the temperature and humidity of the space by touch and perceived comfort of the space. However, a determination that a sleeping environment is healthy can be accomplished quantitatively by measurement metrics that correspond to healthy sleep. For example, by measuring the amount of light, the temperature, the humidity, the temperature/humidity fluctuation over time, and/or air flow of an environment as compared with metrics of known healthy sleeping conditions, it may be determined that a space is suitably healthy for sleep.

Disclosed herein are measurement systems and methods that facilitate the measurement of various material properties using a measurement device that is suitable for use by a consumer. The measurement device may be handheld or portable and affordable for household use. Furthermore, methods and systems described herein can determine if a room is suitable for sleeping, can determine if a particular garment is suitable for the environmental characteristics of a room, and can identify or suggest garments or materials that promote healthy sleeping. For example, the measurement device disclosed herein can determine the thermal resistance of a material by use of non-thermal energy sources, such as one or more of material thickness measurements, acoustic measurements, and infrared measurements. Additionally, the measurement device can determine the suitability of the room for sleep based on temperature sensors and infrared sensors within the measurement device. For the purposes of this description, the term "thermal property" is to be broadly construed as including any property that affects a level of comfort in terms of the wearer's body temperature. Examples of thermal properties include breathability, thickness, thermal resistance, thermal conductivity, compressibility, and so on.

The measurement device can be used by individuals seeking a garment that will be suitable (e.g., comfortable) for their environment (or predicted environment). The measurement device can be used by caregivers to select garments for babies or adults under their care that may not be able to provide feedback on their comfort. For example, a baby may not be able to communicate that they are dressed to warm or to cool for comfortable sleep. While many specific examples are presented, it is to be understood that the described methods, devices, and circuitries are also applicable to the thermal property measurement of any material.

In the following description, a plurality of details are set forth to provide a more thorough explanation of the embodiments of the present disclosure. However, it will be apparent to one skilled in the art that embodiments of the present disclosure may be practiced without these specific details. In other instances, well-known structures and devices are shown in block diagram form or simplified cross-sectional views rather than in detail in order to avoid obscuring embodiments of the present disclosure. In addition, features of the different embodiments described hereinafter may be combined with each other, unless specifically noted otherwise.

FIG. 1A illustrates an exemplary measurement system 100A with a measurement device 100, a user equipment (UE) 155, and a cloud computing device 157 that can determine a thermal property of a material sample 124. Measurement system 100A shows a measurement device 100 that can measure a material sample 124. The measurement device 100 can be placed in a docking station 101. The docking station 101 can be used to charge the measurement device 100. The measurement device 100 can perform measurements on the material sample 124, such as thermal property measurements, to identify the type of material or the specific material of the material sample 124. The thermal property measurements can include infrared, acoustic, or thickness measurements and generate associated infrared data, acoustic data, or thickness data. The measurement device 100 can communicate measurement data (e.g., infrared data, acoustic data, or thickness data), in the form of a measurement report, to one or more of the UE 155 or the cloud computing device 157.

For example, the measurement device 100 can transmit the measurement report to the UE 155 for additional analysis. The UE 155 can perform method operations with the measurement report to determine the material properties of the material sample 124 or to assess the suitability of the environment for healthy sleep. In some embodiments, the UE 155 can communicate with the cloud computing device 157 for method steps or to retrieve information for identifying the material sample 124.

In another example, the measurement device 100 can transmit the measurement report to the cloud computing device 157 for additional analysis. As such, the cloud computing device 157 can perform method operations with the measurement report to determine the material properties of the material sample 124 or to assess the suitability of the environment for healthy sleep.

In another example, the measurement device 100 does not communicate with the UE 155 or the cloud computing device 157. Rather, the measurement device 100 determines the material properties of the material sample 124. In other examples, the measurement device 100 can perform some preliminary method steps to determine material properties of the material sample 124, and transmits a report with preliminary data to one or more of the UE 155 or the cloud computing device 157.

As the measurement device 100, the UE 155, and the cloud computing device 157 can communicate with one another, they can each include a memory interface coupled to a memory, one or more processors coupled to the memory interface, where the one or more processors are configured to perform operations to conduct measurements or perform method steps. Additionally, the measurement device 100, the UE 155, and the cloud computing device 157 can include a transceiver or transceiver circuitry for bi-directional wireless communication with one another that is coupled to the one or more processors. In other embodiments, the measurement device 100 and the UE 155 can be connected to one another through a physical wire (e.g., universal serial bus (USB)).

As such, it is understood that method steps associated with determining the properties of the material sample 124 can be performed by one or more of the measurement device 100, the UE 155, or the cloud computing device 157. Where a device other than the measurement device 100 determines the properties of the material sample 124, a measurement report or analysis report is transmitted and received between devices.

Figure 1B:
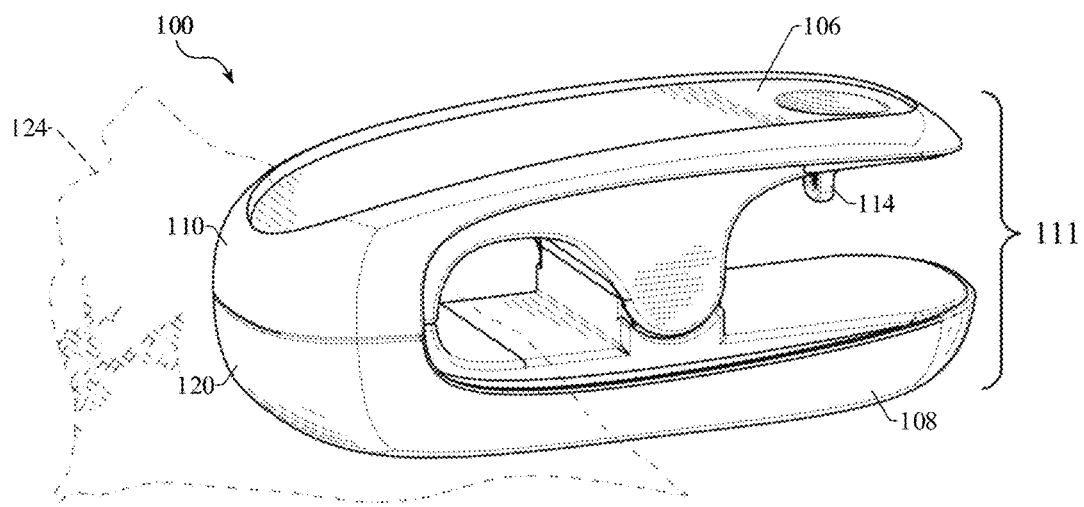
FIGS. 1B, 1C, and 1D illustrate an exemplary measurement device in accordance with FIG. 1A, in accordance with various aspects described.
Figure 1C:
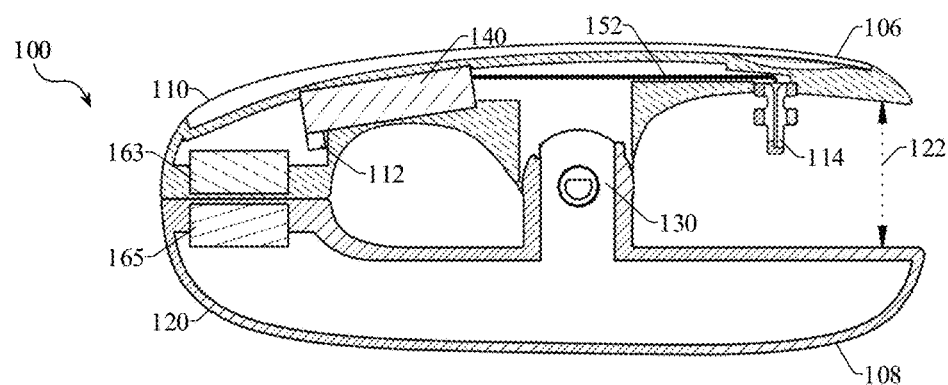
Figure 1D:
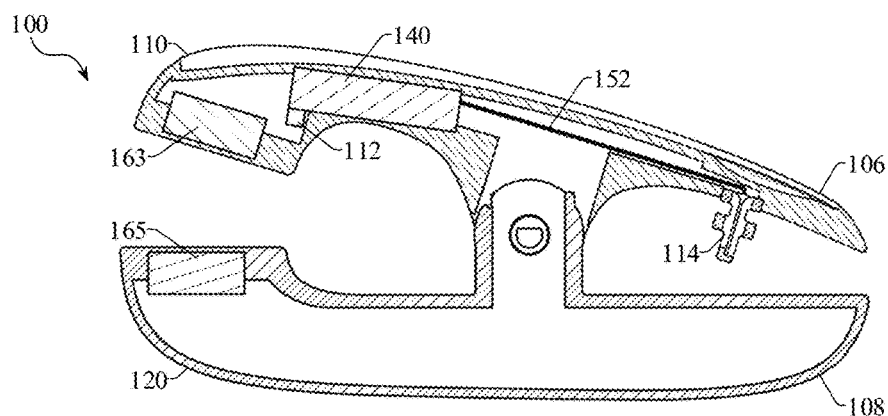

FIGS. 1B, 1C, and 1D illustrates various aspects of a measurement device 100 configured to be portable, handheld, and suitable for consumer use that can measure properties, such as thermal properties, of a material sample 124. FIG. 1B shows a three-dimensional rendering of the measurement device 100 measuring a material sample 124, and FIGS. 1C-1D show two-dimensional cross-sectional views of measurement device 100. In FIGS. 1B-1D, general components of the measurement device 100 can be seen, including a housing with a first member 110, a second member 120, a clamping mechanism 130 connecting the first member 110 to the second member 120, and a handle mechanism 111. The handle mechanism 111 includes a first handle portion 106 arranged over a second handle portion 108, where the first handle portion 106 is separated from the second handle portion 108 by a gap 122. The second member 120 is rotatably coupled to the first member at a pivot within the clamping mechanism 130 that affixes the first member 110 to the second member 120. The handle mechanism 111 is operable to move or pivot the first member 110 and the second member 120 between an open position and a closed position. In some embodiments the first and second members 110, 120 are referred to as a set of clamping jaws.

The clamping mechanism 130 can include a spring that controls the clamping pressure beyond some limit. The clamping mechanism is configured to limit the pressure placed on the material under test to some predetermined amount (e.g., less than approximately 1.5 kPa). The pressure may be controlled by a separate relief feature such as the spring arranged about a pivot point. The measurement device 100 creates repeatable controlled conditions from which to determine the thickness and a thermal property of a material under test.

In a measurement position (e.g., FIG. 1B) an inside surface of the first member 110 contacts a first side of a material sample 124 and an inside surface of the second member 120 contacts a second side of the material sample 124 opposite the first side. In a closed position (e.g., FIG. 1C), without material sample 124, the first member 110 and the second member 120 contact one another. That is, the inside surface of the first member 110 contacts the inside surface of the second member 120. In an open position (e.g., FIG. 1D), the first member 110 and the second member 120 are positioned relatively widely apart from one another and the first member 110 is rotatably separated from the second member 120. The measurement device 100 is configured to clamp a material sample 124 (e.g., FIG. 1B) between the first member 110 and the second member 120 to measure a thermal property of the material sample 124.

The measurement device 100 further includes a first environmental sensor 112 and a second environmental sensor 114. The first environmental sensor 112 is disposed within one of the first member 110 or the second member 120. For example, as shown in FIG. 1C, the first environmental sensor 112 is disposed within the first member 110. The second environmental sensor 114 protrudes from one of the first handle portion 106 or the second handle portion 108. For example, as shown in FIG. 1C, the second environmental sensor 114 protrudes from the first handle portion 106 between the first handle portion 106 and the second handle portion 108 and within the gap 122. In other examples (not pictured), the second environmental sensor 114 is disposed within the housing and is exposed to the air surrounding the housing through openings in the housing arranged over the second environmental sensor 114. In other examples, the second environmental sensor 114 is arranged elsewhere about the housing and is thermally coupled to the air surrounding the housing. As discussed further herein, measurement data from the first and second environmental sensors 112, 114 can be used to determine if the measurement device 100 is at in an appropriate thermal condition to conduct measurements. Measurement data from the first and second environmental sensors 112, 114 can be used to determine healthy sleeping conditions, and can be used to determine if a garment is suitable for wearing based on environmental conditions.

The measurement device 100 further includes one or more source elements 163 and one or more sensor elements 165 within the first member 110 or the second member 120. For example, as shown in FIG. 1C, the one or more source elements 163 are disposed within the first member 110 and the one or more sensor elements 165 are disposed within the second member 120. As discussed further herein, the one or more source elements 163 can include one or more of an acoustic emitter or an infrared emitter. The one or more sensor elements 165 can include one or more of an acoustic receiver or infrared sensor. As discussed further herein, the one or more source elements 163 and the one or more sensor elements 165 can be used to determine thermal properties of the material sample 124.

The measurement device 100 can further include a measurement displacement device within the pivot of the clamping mechanism 130. For example, as discussed further herein, the measurement displacement device can be used to determine a displacement of the first member 110 and the second member 120 which can correlate to a thickness of the material sample 124. As such, thickness data indicative of a thickness of the material sample 124 based on a rotational measurement of the measurement displacement device. The thickness of the material sample 124 can be used to determine the thermal properties of the material sample 124.

Circuitry 140 is disposed within the housing of the measurement device 100 (e.g., FIGS. 1C & 1D). The circuitry 140 includes an indicia circuitry 150 (e.g., FIG. 1E) configured to communicate information related to a determined material property. The indicia circuitry 150 may be configured to display indicia indicative of the information (e.g., through a display screen or displayed visually through a red-green-blue (RBG) light emitting diode (LED) that glows red, green, or blue) and/or generate an audible signal indicative of the information. In one example, indicia circuitry 150 causes a mobile communication device (e.g., cellphone) to display the information or perform method steps on measurement data.

Figure 1E:
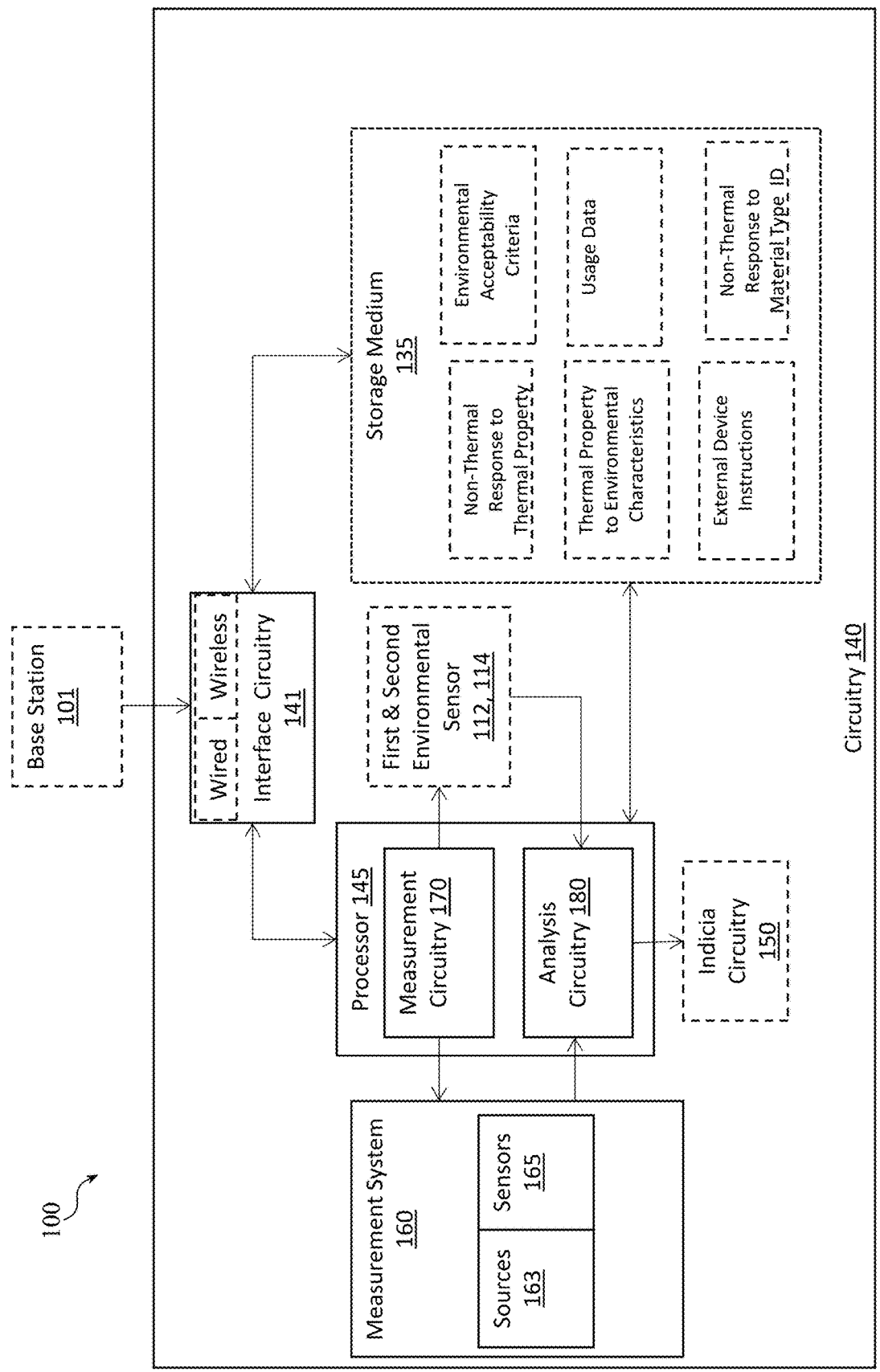
FIG. 1E illustrates a block diagram of a circuitry of the measurement device.

FIG. 1E illustrates a functional block diagram of electronic aspects of the circuitry 140 within the measurement device 100. Many of these electronic aspects are not explicitly labeled in other figures for the sake of simplicity. The circuitry 140 includes a measurement system 160 that includes the one or more source elements 163 and one or more sensor elements 165. The circuitry 140 also includes measurement circuitry 170 configured to control the one or more source elements 163 to apply energy to the material sample 124 and the one or more sensor elements 165 to generate data indicative of the material sample's 124 response to the energy. The measurement circuitry 170 and/or analysis circuitry 180 may be embodied as a processor executing instructions for performing the described functions of the measurement circuitry 170 and/or analysis circuitry 180.

The first and second environmental sensors 112, 114 are configured to measure an environmental characteristic, such as temperature and/or humidity, of the measurement device 100 and/or the environment surrounding the measurement device 100. The analysis circuitry 180 is configured to determine a thermal property of the material sample 124 based on the data from the measurement circuitry 170 and provide information related to the thermal property to the indicia circuitry 150. In one example, the analysis circuitry 180 receives environmental characteristic data from the first and second environmental sensors 112, 114 and determines, based on the thermal property, if the material sample 124 is suitable for the environment. In another example, the analysis circuitry 180 generates a measurement report with the environmental characteristic data and the indicia circuitry 150 transmits the measurement report to one or more of the UE 155 or cloud computing device 157 (e.g., FIG. 1A) to determine if the material sample 124 is suitable for the environment. Additionally, the circuitry 140 can control operation of measurement device 100 based on measurement data such as the temperature data, infrared data, acoustic data, or thickness data.

In another example, the analysis circuitry 180 determines from the environmental characteristic data that the measurement device 100 is ready for use. In this example, the measurement device 100 may be a first temperature, and the environment surrounding the measurement device 100 may be a second temperature (e.g., if the measurement device 100 was brought from a hot car to a cooler room), the analysis circuitry 180 determines if the first temperature and the second temperature are the same or close to one another so that the measurement device 100 can accurately measure thermal properties of the material sample 124. In another example, the analysis circuitry 180 generates a measurement report with the environmental characteristic data and the indicia circuitry 150 transmits the measurement report to one or more of the UE 155 or cloud computing device 157 (e.g., FIG. 1A) to determine if the measurement device 100 can accurately measure thermal properties of the material sample 124.

In another example, the analysis circuitry 180 determines from the environmental characteristic data that the room the measurement device 100 is located in is healthy for sleep. In this example, the second environmental sensor 114 collects temperature and/or humidity data over time, and the analysis circuitry 180 determines if the room's temperature and/or humidity is healthy for sleep. Additionally, or alternatively, the analysis circuitry 180 can monitor the one or more sensor elements 165 to determine if the room has an appropriate level of low light for healthy sleep. In this example, the analysis circuitry 180 can monitor light received by a photodiode of the one or more sensor elements 165 while the measurement device 100 is in a closed position (e.g., FIG. 1C). In another example, the analysis circuitry 180 generates a measurement report with the environmental characteristic data and the indicia circuitry 150 transmits the measurement report to one or more of the UE 155 or cloud computing device 157 (e.g., FIG. 1A) to determine if the measurement device 100 is located in a healthy sleep environment.

In another example, the analysis circuitry 180, the UE 155, or the cloud computing device 157 can determine if a set of measured garments are suitable for a set of environmental characteristics and recommend a garment based on environmental characteristics.

In one example, a base station or docking station 101 is provided into which the measurement device 100 may be docked (e.g., by way of a wired or wireless interface of interface circuitry 141) to allow for communication between the measurement device 100 and another device and/or to charge the measurement device. In this example, the docking station 101 communicates with the measurement device in a same manner as a cellphone may communicate wirelessly (e.g., via Bluetooth) with the measurement device 100. Alternatively, a UE 155 or other device may be plugged into the base station to enable communication between the cellphone or other device and the measurement device 100 when a wireless connection is not available. Additionally, the docking station 101 has a docking feature that closely surrounds the measurement device 100 so that the docking station is thermally coupled to the measurement device 100. This thermal coupling increases the rapidity with which a temperature of the housing of the measurement device 100 is stabilized to a temperature of the room.

In one example, the analysis circuitry 180 is configured to leverage the processing power of an external device (e.g., a cellphone's processing capabilities—UE 155 or cloud computing device 157 of FIG. 1A). In this example, the analysis circuitry 180 includes storage medium 135 storing computer-executable instructions that, when executed by the mobile communication device, cause the external device to receive data, process the data, and transmit the data back to the analysis circuitry 180 for use in determining the thermal property. In another example, the external device receives a measurement report from the measurement device 100 and performs method steps to determine properties of the material sample 124.

The measurement device 100 may include storage medium 135 that is configured to store data used by the device in determining the information that can be displayed by indicia circuitry 150. If the storage medium 135 is not internal to the measurement device 100, the storage medium is accessible to the device by way of a communication link to an external storage medium. Examples of types of data that may be stored in storage medium 135 (e.g., in the form of lookup tables, databases, and so on) include data mapping non-thermal response (indicative of a material's response to a non-thermal stimulus) to thermal property values and data mapping thermal property values to ranges of environmental characteristics (e.g., thermal resistance values mapped to ranges of temperatures in which material having the thermal resistance will be comfortable). In other examples, the data recited above resides on external devices such as the UE 155 or cloud computing device 157, and the external device identifies properties of the material sample 124 based on the data. Data encoding external device instructions (that may be transmitted to a user's device during setup to enable communication and/or co-processing of data) may be stored on one or more of the measurement device 100, the UE 155, or the cloud computing device 157. Environmental acceptability criteria (e.g., acceptable temperature/humidity ranges representing a default set of ranges or a custom set of ranges as determined for a particular user) may be stored on one or more of the measurement device 100, the UE 155, or the cloud computing device 157.

User specific biometric data may also be stored (e.g., age, gestational age, weight, sex) for use in determining suitable calibration schemes and/or processing algorithms to use when determining recommendations, or to adjust calibration constants ensuring the device operation is tailored to the given application/user. For example, for premature or underweight babies (as determined by the user specific data) the thermal resistance recommended by the device for a given ambient temperature may be slightly increased. Usage data which is collected during use of the device may be stored for use in providing historical feedback and/or adapting the operation of the device to fit a particular user's characteristics.

Data mapping a non-thermal response to a material type may also be stored for use in identifying a material type in addition to the material's thermal property. Material type parameters that may be identified include material composition (e.g., cotton vs polyester), thread counts, fabric density, spun/weave/stitch construction, and so on. In one example, some of the data in the storage medium 135 is stored on storage medium in the measurement device 100 and some of the data in the storage medium 135 is stored on a remote device. Data discussed herein may reside on one or more of the measurement device 100, the UE 155, or the cloud computing device 157.

Thermal Property Characterization

Figure 2:
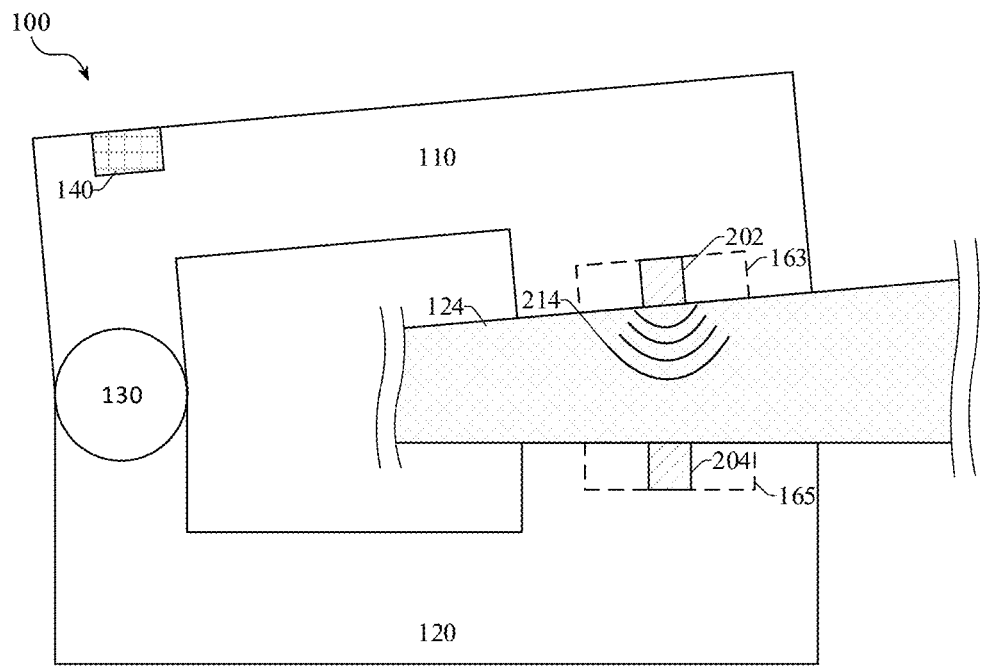
FIG. 2 illustrates a cross-sectional view of an example measurement device with an acoustic emitter and an acoustic receiver, in accordance with various aspects described.

FIG. 2 illustrates a cross-sectional view of the measurement device 100 of FIGS. 1B-1D, with an acoustic emitter 202 and an acoustic receiver 204. FIG. 2 shows material sample 124 thermal property characterization with the acoustic emitter 202 and the acoustic receiver 204. The one or more source elements 163 disposed within the first member 110 include the acoustic emitter 202. The one or more sensor elements 165 disposed within the second member 120 include the acoustic receiver 204. The acoustic emitter 202 faces the second member 120. The acoustic receiver faces the first member 110. Circuitry 140 is configured to control the acoustic emitter and the acoustic receiver.

The material sample 124 is clamped between the first member 110 and the second member 120. To characterize and identify the material sample 124, circuitry 140 causes the acoustic emitter 202 to generate an acoustic signal 214. The circuitry 140 can control the acoustic emitter 202 to sweep the acoustic signal 214 from, for example, a range of frequencies, (e.g., 10 Hertz (Hz) to 22 kilohertz (kHz)). In other examples, the acoustic emitter 202 emits one or more "buzzes" or "beeps" or "chirps" comprising a single tone or chord, at a frequency (e.g., between 10 Hz and 22 kHz). That is, the acoustic emitter 202 can emit a plurality of buzzes, or beeps, or chirps, or chords at different discretized frequencies. The acoustic signal 214 propagates through the material sample 124 and is received by the acoustic receiver 204.

In some embodiments, the acoustic emitter 202 is a speaker and the acoustic receiver 204 is a microphone.

The acoustic signal received by the acoustic receiver 204 is used to generate acoustic data for the material sample 124 by the circuitry 140. The received acoustic signal includes an amplitude and/or a phase response across the transmitted acoustic signal's frequency range (e.g., 10 Hz to 22 Hz—generally referred to as a frequency response). A Fast Fourier Transform (FFT) can be applied to the received acoustic signal by the analysis circuitry 180 to generate FFT data for analysis. In some embodiments, an FFT may not be applied to the received acoustic signal 214 and analog properties of the received acoustic signal are analyzed directly. Analysis circuitry (e.g., analysis circuitry 180 of FIG. 1) analyzes the acoustic data to identify and characterize the thermal properties of the material sample 124. In other embodiments, the measurement device 100 transmits the measurement data to the UE 155 or cloud computing device 157 (of FIG. 1A) to analyze the acoustic data to identify and characterize the material sample 124.

The acoustic data is unique to the material sample 124 and is a function of the propagation of the acoustic signal 214 through the clamped material sample 124. To identify the material sample, the acoustic data may be compared to known scans of various known material samples stored in memory (e.g., storage medium 135 of FIG. 1E, or stored in the UE 155 or cloud computing device 157 of FIG. 1A).

In one example, a method with a Pearson Correlation Coefficient scheme is used to determine the thermal properties of the material sample 124 based on the acoustic data. Specifically, the acoustic data is correlated with known material samples that were previously scanned and entered into a material database that can correspond to a thermal properties database. As such, a device of the measurement system (e.g., measurement system 100A of FIG. 1A) can use the method to identify a material type or specific material and associated thermal properties. For example, a Pearson Correlation is performed on known material samples to generate a table with Pearson Correlation Coefficients. The Pearson Correlation Coefficients are mapped to respective thermal property values or known respective materials in a thermal properties database. The acoustic data is compared to one or more Pearson Correlation Coefficients and the thermal property value of the material sample 124 is a thermal property mapped to one of the one or more Pearson Correlation Coefficients that matches the acoustic data. In some examples, the acoustic data is an exact match to one of the one or more Pearson Correlation coefficients, in other examples, the acoustic data is a best match or closest match that can be defined based on a percentage basis or confidence level.

In some embodiments, the method includes an amplitude sensitivity scheme that is combined with the Pearson Correlation Coefficient. The amplitude sensitivity scheme can enhance the accuracy in determining the material sample 124 uniquely. For example, a Pearson Correlation Coefficient only method may be capable of identifying a type of the material sample 124, for example, whether the material sample 124 is a woven fabric type, a fleece fabric type, a composite fabric type, or the like. With the amplitude sensitivity scheme added to the Pearson Correlation Coefficient scheme, the method can be more sensitive to unique amplitude characteristics of the acoustic data wherein a device of the measurement system can identify the material sample 124 uniquely from a broader category of material type. For example, the acoustic data is compared to the database of Pearson Correlation Coefficients and known acoustic amplitude responses mapped to the thermal properties database. When the acoustic data matches both a Pearson Correlation Coefficient and the known acoustic amplitude response, the thermal property value of the material sample 124 is the thermal property value that maps to the matched Pearson Correlation Coefficient and the known acoustic amplitude response.

In another example, the method includes an integral analysis scheme of the acoustic data to determine the thermal properties of the material sample 124. For example, an amplitude of the acoustic data is determined across the frequency sweep (i.e., frequency response) of the received acoustic signal. The frequency response can be divided into N sections and the area of each of the N sections is calculated. The areas of each of the N sections can be subjected to a Pearson Correlation Scheme or other appropriate correlation scheme to identify the thermal properties of the material sample 124 by correlating the acoustic data to the known material database.

In another example, the acoustic data is analyzed by a machine learning approach using a trained Neural Network to determine the thermal properties of the material sample 124. The Neural Network can be trained on the known material database comprising the frequency response of known materials related to known thermal properties. In some examples, the frequency response includes one or more of phase or amplitude data across frequency. The trained Neural Network can determine the material type and thermal properties of the material sample 124 by prediction. For example, a thermal properties database can store neural network analysis results mapped to acoustic data of known material samples. The thermal property of the material sample 124 can be determined based on the neural network analysis of the amplitude and or phase response of the acoustic data and the thermal properties database. In other examples, neural network analysis is used to generate a mapping of known amplitude and or known phase values of known acoustic data to know materials or known material properties, and the measured acoustic data is matched or correlated with the known acoustic data to determine the known material or property.

The above method examples can consider the thickness of the material sample 124 when determining the thermal properties of the material sample 124. As the material sample 124 is clamped between the first member 110 and the second member 120, the analysis circuitry can determine a thickness of the material sample 124 based on the measurement displacement device within the pivot of the clamping mechanism 130.

As such, the known material database can include a matrix of known material thicknesses that correspond to the known materials. Furthermore, the above method examples can include generating a score that relates to a confidence level in the determined material properties. For example, a higher score can relate to a higher confidence or higher percentage match between the acoustic data and matched material from the database of known materials. It is appreciated that in the above examples the thermal properties of the material sample 124 can be determined based on only the received acoustic signal 214, or based on the received acoustic signal 214 and/or material thickness. That is, the thermal properties of the material sample 124 can be determined without additional sensors such as electromagnetic sensors, heat sensors, infrared sensors, vibration sensors, or the like.

Figure 3:
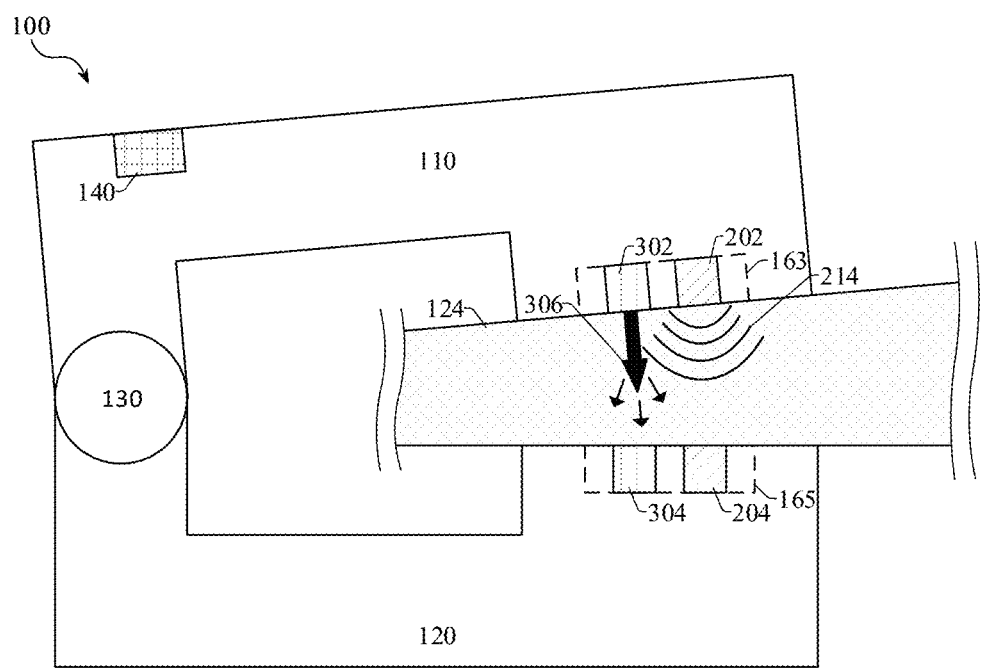
FIG. 3 illustrates a cross-sectional view of an example measurement device with an acoustic emitter, an infrared emitter, an acoustic receiver, and an infrared sensor, in accordance with various aspects described.

FIG. 3 shows thermal property characterization by an acoustic signal 214 and an infrared signal 306. FIG. 3 is an alternative embodiment relative to FIG. 2 where the one or more source elements 163 includes both an infrared emitter 302 and the acoustic emitter 202, and the one or more sensor elements 165 includes both an infrared sensor 304 and the acoustic receiver 204. As such, the infrared emitter 302 is disposed within the first member 110 facing the second member 120 and the infrared sensor 304 is disposed within the second member 120 facing the first member 110.

In this example, a device of a measurement system (e.g., measurement system 100A of FIG. 1A) can determine thermal properties of the material sample 124 based on one or more of an infrared signal 306, the acoustic signal 214, or the thickness of the material sample 124. The circuitry 140 is configured to control the infrared emitter 302 and the infrared sensor 304. The circuitry 140 controls the infrared emitter to emit the infrared signal 306, which is transmitted through the material sample 124 and received by the infrared sensor 304. In some examples, the infrared signal 306 can include wavelengths between 700 nanometers (nm) to 1 millimeter (mm). In other examples, the infrared signal 306 can include wavelengths between 900 nm to 1 mm. In yet other examples, the infrared signal 306 can include wavelengths between 930 nm to 960 nm. In yet other examples, the infrared signal 306 includes a center frequency within the wavelengths described above.

The infrared signal received by the infrared sensor 304 is used to generate infrared data for the material sample 124 by the circuitry 140. The received infrared signal can include an amplitude and/or a phase response across the transmitted infrared signal 306 frequency range (i.e., a frequency response). Thermal properties can be determined by a device of a measurement system based on the infrared data by comparing the infrared data to a database of known infrared characteristics that map to known materials or thermal properties. For example, a voltage received by the infrared sensor 304 generate an amplitude response that is compared to the known infrared characteristics. When the amplitude response matches a known infrared characteristic, the thermal property of the material sample 124 is the known thermal property that maps to the known infrared characteristic. In some embodiments, the infrared emitter 302 emits a pulse-width-modulation (PWM) and the infrared sensor 304 receives an associated square wave that is filtered and averaged to generate the infrared data that is compared to the known infrared characteristics. In some embodiments, the one or more sensor elements 165 include two infrared sensors (shown in FIGS. 6A-6B as first infrared sensor 304 and second infrared sensor 308) and the infrared data is based on the infrared signal 306 received by the two infrared sensors.

A device of the measurement system can determine thermal properties of the material sample 124 according to various regression schemes. That is, the thermal properties can be determined using a regression scheme that incorporates one or more measurements such as thickness, acoustic data, or infrared data of the material sample 124. A device of the measurement system can perform a method in which the thermal property values determined from the one or more measurements are checked by comparison to individual regressions of a particular sensor. For example, a thermal property value determined using only the acoustic data (e.g., an acoustic thermal property value) is compared to another thermal property value determined using only the infrared data (e.g., an infrared thermal property value).

The acoustic thermal property value and the infrared thermal property value should agree or be within a threshold value or range of one another. However, in some instances, peculiarities of a garment (e.g., material sample 124) may result in the different measurement schemes producing thermal property values that disagree. For example, if the measurement device 100 is clipped on a garment with both a fabric material and screen printing (i.e., a logo or decorative feature printed on the fabric from a polymer type material), the regression of the independent measurement schemes may not agree. That is, the acoustic system may produce an accurate thermal property value and the infrared system may produce an anomalous reading when the measurement device 100 clamps a portion of the garment that includes screen printing. In such situations, the device can determine that the thermal property values determined by the acoustic system and the infrared system do not agree, and generate a notification to reposition the measurement device 100 onto another portion of the garment to re-measure the thermal properties of the garment.

Another example includes waterproof fabrics where the infrared system is insensitive to waterproof garments and the acoustic system is sensitive to waterproof garments producing large deviations between the acoustic data and the infrared data resulting in thermal property values that disagree. As such, a first thermal property value determined based on the acoustic data will not be within an acceptable predetermined range of a second thermal property value determined from the infrared data for a waterproof garment, and the measurement device 100 can generate a notification that the garment is not suitable for sleep. In this manner the measurement device 100 can detect fabric decorations, waterproof fabrics that may not be suitable for sleep, or other unusual garment features.

A device of a measurement system can determine if thermal property values generated by various independent measurement schemes satisfy acceptable relationships or threshold limits when performing regression analysis. Independent measurement schemes can include thickness only schemes where the thermal property of the material sample 124 is determined solely by a thickness of the material sample 124. The independent measurement schemes can further include acoustic only, or infrared only thermal property determination schemes. The independent measurement schemes can further include thermal property determination by a combination of sensors, for example, infrared and acoustic measurements, or infrared and thickness measurements, or acoustic and thickness measurements, or infrared, acoustic, and thickness measurements. As such, a device of the measurement system can perform regression analysis on any combination of independent measurement schemes described above.

Figures 4, 5:
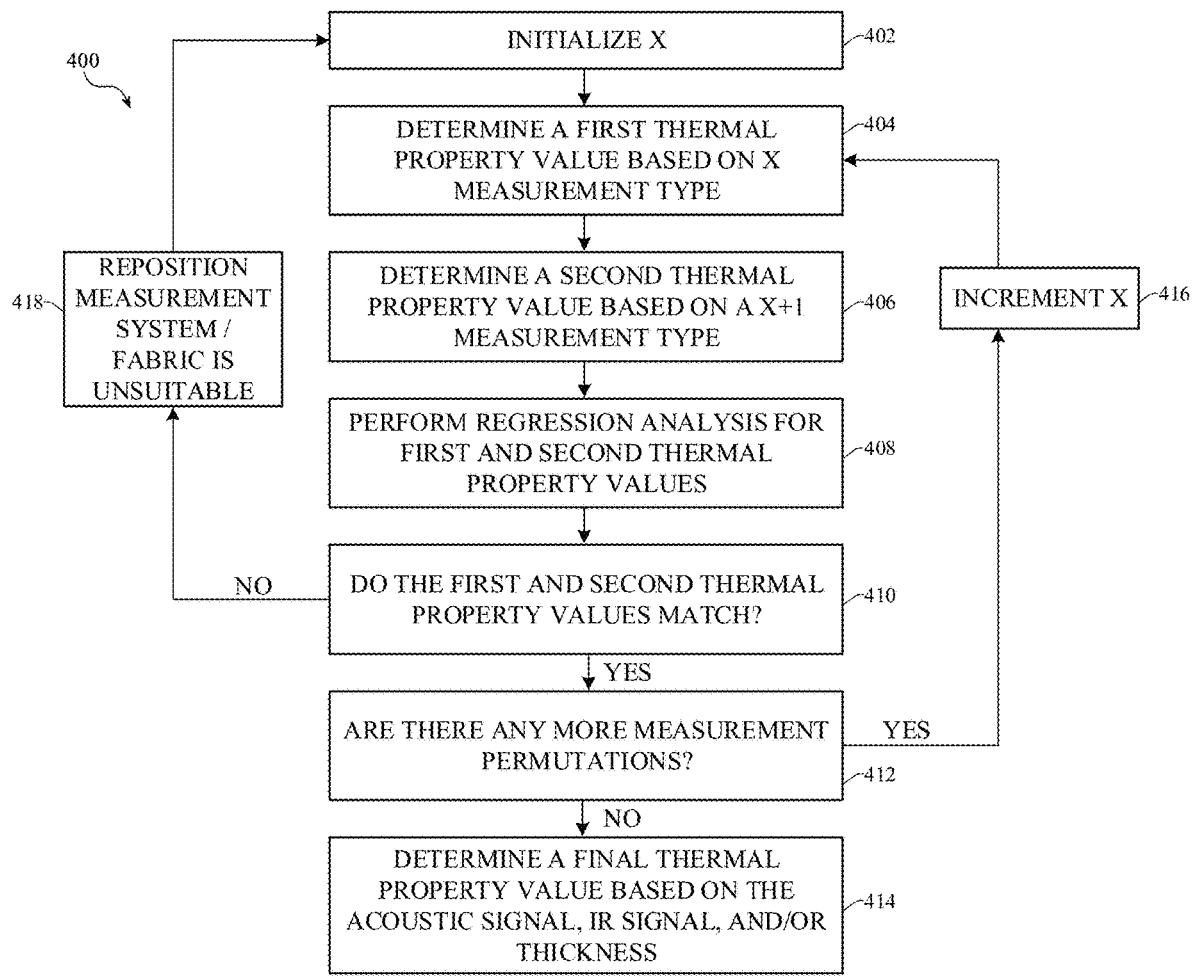
FIG. 4 is a flow diagram of a regression method executed by a device of a measurement system, in accordance with various aspects described.
FIG. 5 shows an example thermal measurement type table for use by the regression method of FIG. 4.

Example methods that include regression schemes are described in accordance with FIGS. 4 and 5. FIG. 4 shows an example regression method 400 that a device of the measurement system can execute, and FIG. 5 shows a table 500 with example thermal measurement types used by the example regression method 400. It is understood that the regression method 400 and associated table 500 are merely non-limiting examples, and a device of the measurement system can implement alternative regression algorithms in accordance with the one or more measurement schemes that include thickness, infrared, and acoustic schemes to determine the thermal properties of the material sample 124.

At 402, variable X is initialized, for example, to a value of 1. At 404, a first thermal property value based on a X measurement type is determined. In this example, table 500 shows that X=1 corresponds to the acoustic thermal measurement type. As such, at 404, a device of the measurement system can determine the first thermal property value based on the acoustic system as described in accordance with FIG. 2. For example, the first thermal property value is determined based on acoustic data using the FFT analysis, Pearson Correlation Coefficient scheme, the amplitude sensitivity scheme, the integral analysis scheme, machine learning, or the like in combination with the known material database.

At 406, a thermal property value based on a next (e.g., X+1) measurement type is determined. In this example, table 500 shows that X+1=2 corresponds to the thickness measurement type. As such, at 406, a device of the measurement system can determine a second thermal property value based solely on the measured thickness of the material sample 124. For example, a device of the measurement system can compare the measured thickness to a database of known material thicknesses that correspond to a range of thermal properties.

At 408, regression analysis is performed on the first and second determined thermal property values. For example, when X is 1, the regression analysis compares the first thermal property value determined from the acoustic measurement and the second thermal property value determined from the thickness measurement. At 410, the regression scheme further includes determining if the first and second thermal property values match. When the first and second thermal property values do not match, the thermal property values may be said to be a mismatch. A match is defined by thermal property values that are within a range of agreement and a mismatch is defined by thermal property values that are outside the range of agreement.

If the X and X+1 thermal properties do not match, then a device of the measurement system can generate a notification that the measurement device 100 should be repositioned at 418 and the method returns to 402, where X is re-initialized and the regression scheme restarts. In some examples, in response to a mismatch between the first thermal property value and the second thermal property value, a mismatch notification can be generated at 418. In some examples, the device can determine that when act 418 occurs a predetermined number of times, then the material sample 124 or fabric is unsuitable for use and thus generate a notification that the fabric is unsuitable. If the material sample 124 is determined to be unsuitable, the method 400 ends after generating the notification that the fabric is unsuitable.

If the first and second thermal properties do match, then the regression scheme can determine if there are more possible measurement permutations for regression (e.g., additional options as shown in table 500) at 412. If there are more measurement permutations, then X can be incremented at 416. When a device of the measurement system determines that X=5 has not been reached, a new regression is performed where at 404 the first thermal property value can be determined. In this example, X is 2 and the thermal property is determined based on the thickness measurement which was previously performed, as such, a device of the measurement system can re-use the thickness measurement previously performed. At 406, the thermal property is determined based on the X=X+1 measurement type. In this example, X=3, and the second thermal property value corresponds to the infrared measurement as shown in table 500. As a device of the measurement system has not yet performed an infrared measurement, a device of the measurement system can perform the infrared measurement using the infrared system as described in accordance with FIG. 3.

At 408 and 410, regression analysis is performed on the first and second thermal property values to determine if they match or are within a threshold of one another. The regression scheme continues through method 400 as described previously until all the thermal measurement types of table 500 are exhausted. In this example, regression is performed on the following pairs of measurement types, acoustic and thickness, thickness and infrared, infrared and acoustic+thickness, acoustic+thickness and infrared+thickness, and infrared+thickness and acoustic. When it is determined that there are no more measurement permutations in table 500, the regression scheme concludes with a final thermal property determination of the material sample 124 based on a combination of one or more of the acoustic signal, infrared (IR) signal, and thickness at 414.

Method 400 can include a multi-dimensional look up scheme. For example, depending on the thermal property measurement/analysis type, a multi-dimensional scheme can be used to determine a thermal property value. For example, where acts 404, 406, or 414 include two or more variables (e.g., acoustic+thickness, infrared+thickness, or acoustic+infrared+thickness), the measurement data can be compared to a multi-dimensional look up table. The multi-dimensional look up table can be generated based on known data for corresponding measurement types and mapped to known thermal properties or known materials. The measurement data is compared to the multi-dimensional look up table and when the measurement data matches respective values in the look up table, the thermal property associated with the measurement data is determined to be the known thermal property or material mapped to the matched look up table values. The measurement data can match respective values in the look up table by varying degrees. That is the match can be exact, a closest match, a best match, an interpolated match, a match within a predefined limit, predefined percentage, or amount that yields repeatable and acceptable identification of material properties or specific materials. As such, the term "match" is used as described above herein.

For example, at 404, the first thermal property value can be based on measured acoustic data and measured thickness data. The multi-dimensional look up table can include known acoustic data and known thickness data mapped to known thermal properties or known materials. Where the acoustic data and thickness data correspond to a matched set of known acoustic data and known thickness data, the first thermal property value is determined to be the thermal property or material that maps to the matched set of known data. In some examples an exact match between measured data and known data does not exist and thus a confidence level can be generated based on how close the measured data matches the known data to determine the likelihood that the measured data corresponds to a known property or material (e.g., estimating a nearest neighbor within the multi-dimensional map and associated known property or material). While this example describes a two-dimensional analysis, it is appreciated that the multi-dimensional map can be three or more dimensions. With more dimensions, higher accuracy of determining the property or material is achievable. It is also appreciated that acts of method 400 can be performed by any device of the measurement system. For example, the measurement device can perform all of method 400. In other examples, the measurement device can perform the measurement data functions of acts 404, 406, and 414, then transmit a measurement report with one or more of infrared data, acoustic data, or thickness data to the UE or cloud computing device to perform non-measurement acts of method 400. As such, the UE or the cloud computing device can transmit and the measurement device can receive an indication to perform acoustic, infrared, or thickness measurements as part of measurement acts associated with method 400 (e.g., 404, 406, 414).

Method 400 of FIG. 4 has the benefit of independently comparing different measurement schemes to ensure the material sample 124 is properly identified amidst garments with irregularities and notify the need for repositioning the measurement device 100 (e.g., when clamped over screen printing) or notify that the measured garment is not appropriate for sleep (e.g., waterproof garment). Furthermore, the regression scheme 400 has the benefit of multi-faceted measurements and associated thermal property determination based on the thickness, infrared, and acoustic systems which can result in accurate thermal property determination and material sample 124 identification.

It is appreciated that one or more methods discussed herein, including method 400, can determine the thermal property value by matching measurement data with a thermal properties database. For example, the thermal properties database map respective known thermal property values to respective sets of one or more of acoustic data values, infrared data values, or thickness data values. The thermal property value is determined by mapping a known thermal property value of the thermal properties database to one or more of values of the acoustic data, infrared data, or thickness data (that is the measured acoustic, infrared, and thickness data).

In some examples, the measurement device 100 can perform one or more of the acoustic measurement, the infrared measurement, or the thickness measurement in response to the rotational measurement satisfying a rotational threshold for a predetermined period of time. For example, the measurement device 100 can be clamped on the material sample 124, and when the measurement device 100 is clamped within the rotational threshold (e.g., relating to an angle of movement between the first and second members where the measurement device 100 can perform measurements), for a predetermined amount of time (e.g., the measurement device 100 is clamped statically for a sufficient amount of time), then the measurement device 100 can perform one or more measurements.

The measurement device 100 and associated measurement and regression schemes described in FIGS. 3-5 can be costly as multiple measuring systems are required. As such, it is appreciated that a measurement device 100 that is lower cost can be implemented, such as the measurement device 100 of FIG. 2, where only an acoustic system is implemented.

Infrared Emitter and Sensor Alignment

Figure 6A:
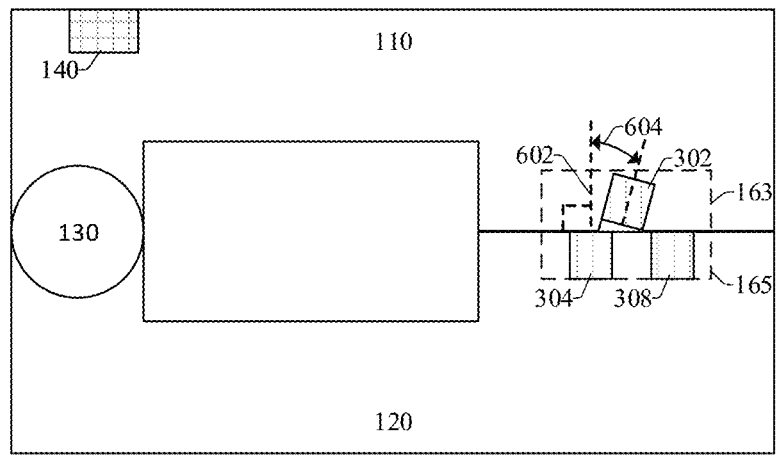
FIGS. 6A, 6B, and 6C illustrate various cross-sectional views of a measurement device with an infrared emitter and infrared sensor that are misaligned in a closed position and aligned in an open position, in accordance with various aspects described.
Figure 6B:
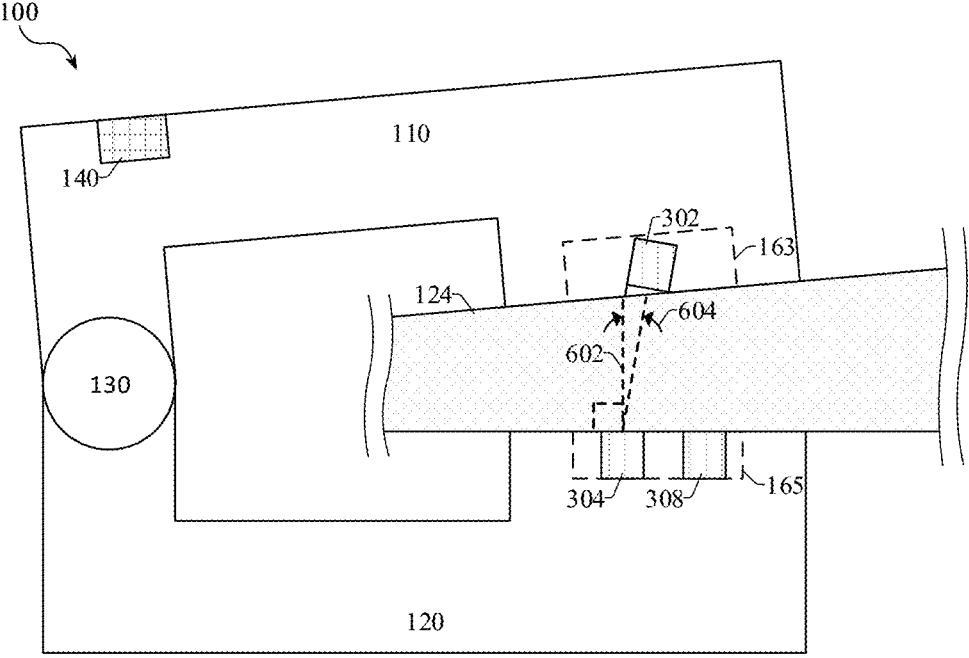
Figure 6C:
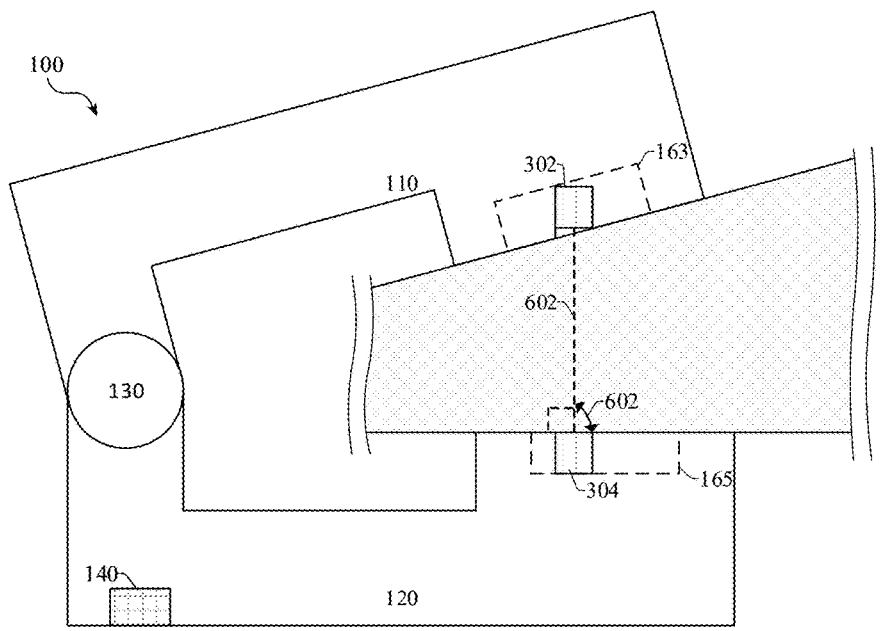

FIGS. 6A, 6B, and 6C illustrate various cross-sectional views of a measurement device 100 with an infrared emitter 302 and infrared sensor 304 that are misaligned in the closed position. The measurement device 100 of FIGS. 6A-6C are alternative embodiments relative to FIG. 3, where in FIGS. 6A-6C the infrared emitter 302 is disposed within the first member 110 at an oblique angle relative to the infrared sensor 304 and can be laterally offset from the infrared sensor 304. In this example, a second infrared sensor 308 is disposed within the second member 120. As such, the infrared sensor 304 can be referred to as a first infrared sensor 304. The second infrared sensor 308 can increase accuracy in identifying the material sample 124 where the infrared data includes the reception of infrared light from both the first infrared sensor 304 and the second infrared sensor 308. As such, the measurement device 100 can include one or more infrared sensors and other systems described herein can include the one or more infrared sensors. While FIGS. 6A-6C only show the infrared system, the measurement device 100 can also include the acoustic system depicted in FIGS. 2-3. When a device of the measurement system is used to determine the thermal property of the material sample 124 with the infrared system, it can be advantageous to ensure the infrared signal (e.g., infrared signal 306 of FIG. 3) transmitted by the infrared emitter 302 does not saturate the infrared sensor 304. For example, when the material sample 124 is relatively thin, the infrared emitter 302 can be positioned closer to the infrared sensor 304 and saturate the infrared sensor 304 during a measurement. Furthermore, it can be advantageous to ensure the infrared signal 306 is strong enough to penetrate or pass through the material sample, for example, when the material sample 124 is thick and the measurement device 100 is opened to a maximum position.

As such, the infrared emitter 302 can be arranged within the first member 110 such that the infrared emitter 302 is intentionally angularly misaligned and/or laterally offset relative to the infrared sensor 304 so that the infrared signal 306 does not saturate the infrared sensor 304. Furthermore, when the measurement device 100 is opened to the maximum position, the infrared emitter 302 and the infrared sensor 304 can be aligned to realize maximum reception of the infrared signal 306 by the infrared sensor 304. FIGS. 6A-6C show examples where the infrared emitter 302 is arranged within the first member 110 in a static position (i.e., the infrared emitter 302 is geometrically fixed within the first member 110) where in the closed position (e.g., FIG. 6A) the infrared emitter 302 is misaligned with the infrared sensor 304. Additionally, the infrared emitter 302 is arranged within the first member 110 such that in the maximum open position (e.g., FIG. 6C) the infrared emitter is aligned with the infrared sensor 304. As such, in the maximum open position, the infrared emitter and the infrared sensor are aligned oriented angularly normal with respect to one another.

As such, the infrared emitter 302 does not require an additional means of mechanical motion to align or misalign the infrared system to obtain accurate measurement data beyond opening and closing the measurement device 100. Furthermore, the infrared emitter 302 does not require power scaling to avoid saturating the infrared sensor 304 based on a rotational position of the first member 110 and the second member 120. Rather, the infrared system can use relatively higher and fixed infrared signal (e.g., infrared signal 306 of FIG. 3) power level compared to other schemes. Thus, the infrared system is optimized using geometric relationships between where the infrared emitter 302 is disposed within the first member 110, and how the infrared emitter 302 aligns with the infrared sensor 304 disposed in the second member 120 as the measurement device 100 transitions from the closed position to the open position.

FIG. 6A shows the measurement device 100 in a closed position without a material sample 124, where the first member 110 and the second member 120 are in contact with one another. The infrared emitter 302 is disposed within the first member 110 and arranged over the infrared sensor 304 that is disposed within the second member 120. In the closed position, the infrared emitter 302 and the infrared sensor 304 are misaligned. In FIG. 6A, the misalignment is shown where the infrared emitter 302 and the infrared sensor 304 are laterally offset from one another. Additionally, the infrared emitter 302 is rotated relative to the infrared sensor 304 at an oblique angle 604 that is oblique to a normal line 602 of the infrared sensor 304. The normal line 602 is normal to a surface of the infrared sensor 304 that faces the first member 110. For example, the normal line 602 is aligned with a center point of the surface of the infrared sensor 304 and the infrared emitter 302 can be at an oblique angle 604 defined between the center point of the surface of the infrared sensor 304 and a center point of the surface of the infrared emitter 302 that faces the second member 120. In the closed position, the oblique angle 604 can, for example, be 75 degrees or more from the normal line 602. In some examples, the oblique angle 604 is related to the maximum angle of opening the clamping mechanism 130. For example, if the maximum angle of opening the clamping mechanism 130 is 20 degrees, then the infrared emitter 302 is rotated 20 degrees relative to the infrared sensor 304 in the closed position. As the oblique angle is defined based on the normal line 602, the oblique angle is 90 degrees minus the maximum angle of opening the clamping mechanism 130, which in this example would be 70 degrees.

FIG. 6B shows the measurement device 100 in the open position with a material sample 124. In this example, the open position is shown as an intermediary open position, where the rotatable angle between the first member 110 and the second member 120 is an intermediary rotatable angle that is less than a maximum rotatable angle between the first member 110 and the second member 120. In this example, the infrared emitter 302 is laterally offset from the infrared sensor 304 by an offset amount that is less relative to the closed position shown in FIG. 6A. Additionally, the infrared emitter 302 and the infrared sensor 304 are angularly more aligned compared to the closed position. For example, the oblique angle 604 defined between the surface of the infrared emitter 302 facing the infrared sensor 304 relative to the normal line 602 in the intermediary open position is less than the oblique angle 604 in the closed position. In the intermediate open position, the oblique angle 604 can, for example, be more than 0 degrees and less than 75 degrees from the normal line 602.

FIG. 6B shows the measurement device 100 in the open position with a material sample 124. In this example, the open position is shown as a maximum open position where the rotatable angle between the first member 110 and the second member 120 is the maximum rotatable angle. In the maximum open position, the infrared emitter 302 is substantially aligned over with the infrared sensor 304. The infrared emitter 302 is substantially aligned laterally with the infrared sensor 304, and the infrared emitter 302 is substantially normal to the infrared sensor 304. That is, an angle between the midpoint of the surface of the infrared emitter 302 that faces the infrared sensor 304, and the midpoint of the surface of the infrared sensor 304 that faces the infrared emitter 302, is substantially normal to the surface of the infrared emitter 302 and substantially normal to the surface of the infrared sensor 304.

In some embodiments, the housing of the measurement device 100, including the first member 110 and the second member 120, of FIGS. 6A-6C is comprised of a material that passes infrared light through the housing. That is the material can pass infrared light at a first intensity from an external surface of the housing to a second intensity at an internal surface of the housing, where the second intensity is less than the first intensity. The housing, for example, can be or comprise one or more of a plastic, a polyethylene material, an acrylonitrile butadiene styrene (ABS) material, a fiberglass material, a polycarbonate material, a nylon material, or the like. As discussed further herein, the measurement device 100 (e.g., circuitry 140 of FIG. 1E) can control the infrared system and a device of the measurement system can determine if the lighting is conducive for healthy sleep when the housing is a semi-transparent material.

It is appreciated that the infrared system of the measurement device 100 described in accordance with FIGS. 6A-6C can be combined with the acoustic system of FIG. 3 and the measurement device 100 can perform measurements of the material sample 124 as described in accordance with FIGS. 2-3, and the regression method described in FIG. 4. The examples discussed in accordance with FIGS. 6A-6C show the infrared sensor 304 substantially level with the inside surface of the second member 120 that contacts the material sample 124 (e.g., FIG. 6B) or contacts the first member 110 without the material sample 124 (e.g., FIG. 6A). The examples also show the infrared emitter 302 rotated with respect to the inside surface of the first member 110 that contacts the material sample 124 (e.g., FIG. 6B) or contacts the second member 120 without the material sample 124 (e.g., FIG. 6A). It is appreciated that in alternative embodiments (not shown), the infrared emitter 302 can be substantially level with the inside surface of the first member 110 and the infrared sensor 304 can be rotated with respect to the inside surface of the second member 120. In other embodiments (not shown), the infrared emitter 302 can be rotated with respect to the inside surface of the first member 110 and the infrared sensor 304 can be rotated with respect to the inside surface of the second member 120.

Measurement Device Control with Environmental Sensors

Figure 7:
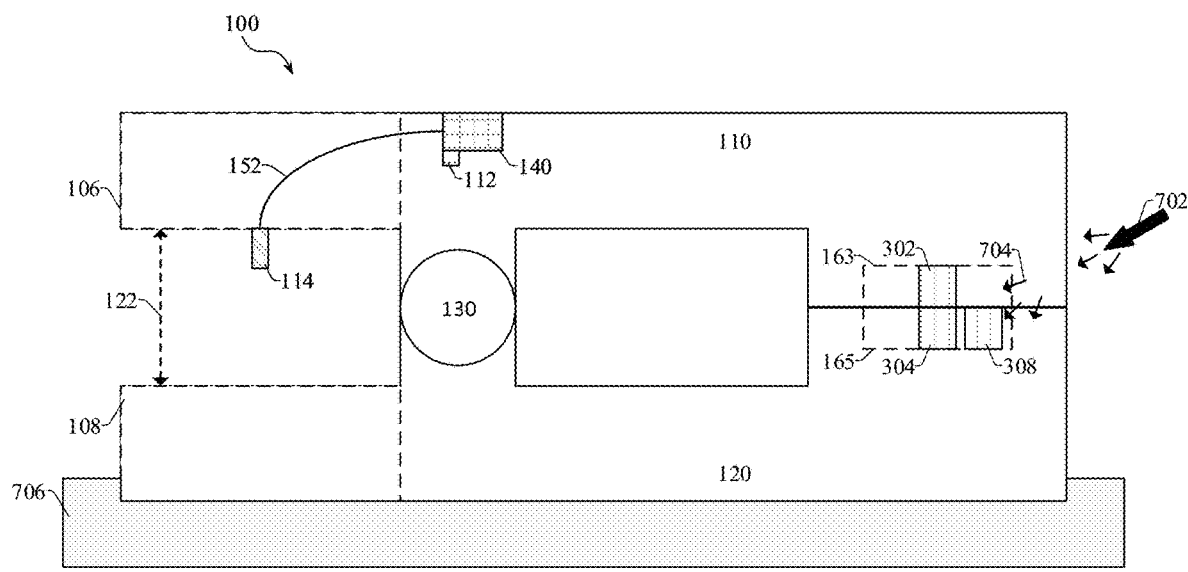
FIG. 7 illustrates a cross-sectional view of a measurement device with environmental sensors configured to determine the health of a sleep environment, in accordance with various aspects described.

FIG. 7 illustrates a cross-sectional view of a measurement device 100 with environmental sensors configured to measure characteristics associated with the health of a sleep environment. A device of a measurement system (e.g., measurement system 100A of FIG. 1A) can determine properties, such as a thermal property, of a material sample, and/or identify the material sample. The device can, for example, determine if the material sample is suitable for sleeping based on the thermal property and environmental conditions (i.e., temperature, humidity, etc. . . . ) of the sleep environment as measured by the first environmental sensor 112. Just as there are garments optimally suitable for sleeping, there are sleep environment conditions that are optimally suitable for sleeping. The second environmental sensor 114 and the infrared sensor 304 can be used to determine if the sleep environment is suitable for sleeping based on one or more of the temperature or humidity, the fluctuation of temperature or humidity over time (i.e., draftiness of the room), or the intensity of light in the sleep environment.

In some examples, the device can determine the properties of the material sample more accurately when the temperature of the housing is substantially the same as the ambient temperature of a room or sleep environment, or when the temperature of the housing is within a calibrated temperature range. As such, the device can determine if the housing is substantially the same temperature as the ambient temperature of the room by comparing a first temperature of the first environmental sensor 112 to a second temperature of the second environmental sensor 114 and notifying the user to wait for the temperature of the measurement device 100 to stabilize. Aspects of the measurement device 100 related to determining if the measurement device 100 is ready for use based on the housing temperature is discussed further herein. Aspects of the measurement device 100 related to determining if the sleep environment is suitably healthy for sleep are also discussed further herein.

FIG. 7 shows the measurement device 100 in the closed position without a material sample. The one or more source elements 163 within the first member 110 is shown with the infrared emitter 302 and the one or more sensor elements 165 within the second member 120 is shown with the first infrared sensor 304 and the second infrared sensor 308. It is appreciated that the one or more source elements 163 can further include the acoustic emitter and the one or more sensor elements 165 can further include the acoustic receiver as described previously, however they are omitted for simplicity of explanation.

The housing includes circuitry 140 disposed within one of the first member 110 or the second member 120. In some embodiments, the circuitry 140 is disposed within a printed circuit board (PCB) that is mounted to the housing. In some embodiments, the first environmental sensor can be mounted on the PCB. The housing further includes a first handle portion 106 and a second handle portion 108 separated from one another by a gap 122. The second environmental sensor 114 protrudes from the second handle portion 108 where the second environmental sensor 114 protrudes between the first handle portion 106 and the second handle portion 108 within the gap 122. In other embodiments, the second environmental sensor 114 is disposed within the housing and is exposed to the air surrounding the housing through openings in the housing arranged over the second environmental sensor 114.

The housing further includes a flexible circuit board 152 connected to the PCB and the second environmental sensor 114. As such, the second environmental sensor 114 is mounted to the flexible circuit board 152 and protrudes through the second handle portion 108 from the flexible circuit board 152. The first environmental sensor 112 senses a temperature within the measurement device 100 and the second environmental sensor 114 senses a temperature outside of the measurement device 100. Physical contact between the first or second environmental sensors 112, 114 and the housing can thermally couple the first or second environmental sensors 112, 114 to the housing. Thermal coupling between the housing and the second environmental sensor 114 can reduce the accuracy in sensing the temperature outside of the measurement device 100. That is, when the second environmental sensor 114 is coupled to the housing, the second environmental sensor 114 less accurately reports the temperature outside of the measurement device 100 or more accurately reports the temperature of the measurement device 100. The second environmental sensor 114 can be physically separated from the second handle portion 108 to improve the accuracy of sensed temperature outside of the measurement device 100. Furthermore, the flexible circuit has a thermal mass that is less than the thermal mass of the PCB to minimize thermal coupling between the housing and the second environmental sensor 114. In some embodiments, a first thermal coupling amount between the flexible circuit board and the housing is at least an order of magnitude less than a second thermal coupling amount between the PCB and the housing.

In some embodiments, the measurement device 100 can have a docking station 706 (e.g., the docking station 101 shown in FIG. 1A). The measurement device 100 can be placed on the docking station such that the housing contacts the docking station 706. The housing can thermally couple to the docking station 706. As such, the thermal mass of the measurement device 100 can be increased when in contact with the docking station 706. By increasing the thermal mass of the measurement device 100, the measurement device 100 can reach a steady state temperature suitable for material sample measurements more quickly relative to embodiments without the docking station 706. In some examples, the docking station 706 is shaped to maximize the surface area of contact between the measurement device 100 and the docking station 706. Maximizing the surface area of contact accelerates the equalization of temperature between the measurement device 100 and the docking station 706.

As discussed in accordance with FIGS. 6A-6C, the housing of the measurement device 100 can be made of a material that can pass infrared light from an external surface of the housing to an interior of the housing. For example, an exterior light source 702 can impinge on the housing, for example the first and second members 110, 120. A residual light 704 of the exterior light source 702 passes through the housing and radiates through the interior of the housing where one or more of the first infrared sensor 304 or the second infrared sensor 308 can detect the light. Thus the infrared data can be generated from one or more of the first infrared sensor 304 or the second infrared sensor 308. As such, a device of the measurement system can generate a notification that the sleep environment is non-optimal in response to receiving the residual light 704.

Figure 8:
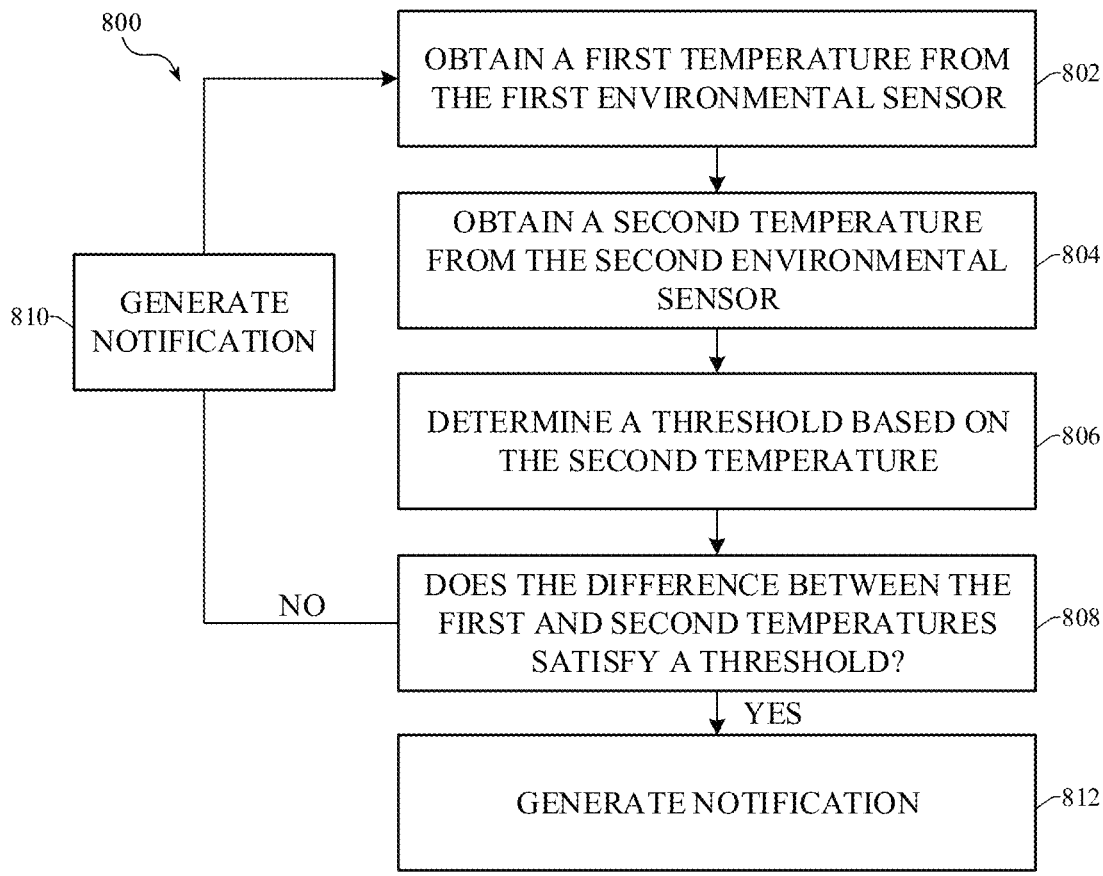
FIG. 8 shows a flow diagram of a method for determining that a measurement device is at an appropriate temperature for conducting material property measurements.

FIG. 8 shows a flow diagram of a method 800 for determining that a measurement device is at an appropriate temperature for conducting material property measurements. In some examples, the measurement device is the measurement device 100 of FIG. 7 and a device of the measurement system of FIG. 1A can be configured to perform method 800.

At 802, the method includes obtaining a first temperature (or generating a first temperature data) from the first environmental sensor (e.g., first environmental sensor 112 of FIG. 7). The first environmental sensor senses the temperature within the measurement device and thus the first temperature measures an internal or interior temperature of the housing.

At 804, the method includes obtaining a second temperature (or generating a second temperature data) from the second environmental sensor (e.g., second environmental sensor 114 of FIG. 7). The second environmental sensor senses a temperature outside of the measurement device, such as the ambient air. That is, the second environmental sensor senses an external temperature proximate to the measurement device. In some embodiments the first temperature data and the second temperature data are generated for a predetermined period.

At 806, the method includes selecting a known threshold based on the second temperature. In some embodiments, the acceptable temperature difference between the housing of the measurement device and the ambient air can be different depending on the ambient air temperature. For example, if the second temperature is within a first temperature range, such as greater than 15 Celsius (C) and less than 25 C, a first threshold for the difference between the first temperature and the second temperature can be 1.5 C. In another example, if the second temperature is within a second temperature range, such as greater than 25 C, a second threshold for the difference between the first temperature and the second temperature can be 1 C. In another example the first threshold is 1.5 C at 15 C, the second threshold is 1 C at 25 C, and an intermediary threshold is interpolated between 15 C and 25 C, as indicated by the second temperature. Thus, the method includes determining that the second temperature (or second temperature data) of the second environmental sensor is within the first temperature range and selecting the first threshold or determining that the second temperature of the second environmental sensor is within the second temperature range and selecting the second threshold (or selecting the intermediary threshold between 15 C and 25 C).

As such, the first temperature range can have lower temperatures than the second temperature range, and the first threshold can be greater than the second threshold. A lower threshold (e.g., 1 C difference) can result in more accurate measurements by the measurement device which can be can be advantageous for higher sleeping temperatures relative to lower sleeping temperatures. It is appreciated that the temperature ranges and thresholds can be different than those described above, and more than two temperature ranges can exist (e.g., three, four, etc. . . . ) and can be application dependent. That is the temperature ranges and thresholds may be specific for a clothing application, a factory application, construction applications, or the like.

At 808, the method includes determining that a temperature difference between the first temperature and the second temperature satisfies a threshold, such as the first threshold or the second threshold. In some embodiments the temperature difference is calculated as the absolute value of the first temperature (T1) minus the second temperature (T2) (e.g., |T1−T2|). The threshold can be satisfied when the difference is less than the threshold (e.g., |T1−T1|<threshold). In some embodiments, the method includes determining, based on the temperature measurements from the first environmental sensor and the second environmental sensor, that the housing is substantially the same temperature as the ambient air within the gap based on the first threshold or the second threshold. In some alternative embodiments, act 808 includes determining that the first temperature data is substantially the same as the second temperature data over a predetermined period.

At 810, when the difference between the first and second temperatures do not satisfy the threshold (e.g., |T1−T1|> first or second thresholds), the method includes generating a notification that the measurement device is not ready to use for thermal property or material sample identification. In response to the difference between the first and second temperatures not satisfying the threshold, the method can return to act 802 to re-obtain temperature readings and determine if a difference between updated temperatures satisfy the threshold.

At 812, when the difference between the first and second temperatures satisfy the threshold (e.g., |T1−T1|<the first or second thresholds), the method includes generating a notification that the measurement device is ready for use for thermal property or material sample identification. In alternative embodiments, act 812 generating a notification indicating that the measurement device is ready to use in response to the determination at act 808 that the first temperature data is substantially the same as the second temperature data. As such, the circuitry that performs the method can control the measurement device based on the difference between the first temperature data and the second temperature data.

In an alternative embodiment, the method can include determining that the measurement device is at an appropriate temperature based on the second temperature (or second temperature data) from the second environmental sensor alone. That is, the first temperature is not needed to determine that the measurement device is at an appropriate temperature for use. In this alternative embodiment, the method includes obtaining the second temperature from the second environmental sensor and determining if the second temperature satisfies a temperature range. For example, the method can include determining that the measurement device is at an appropriate temperature when the second temperature is between 15 C to 25 C (i.e., the temperature range). When the second temperature satisfies the temperature range, the method can include generating a notification that the measurement device is ready for use. When the second temperature does not satisfy the temperature range, the method can include generating a notification that the measurement device is not ready for use, and subsequently obtain an updated second temperature and proceed to determining that the housing has stabilized where the second temperature satisfies the temperature range.

It is also appreciated that acts 806-812 can be performed by any device of the measurement system. For example, the measurement device can perform all of method 800. In other examples, the measurement device can perform acts 802 through 804, then transmit a measurement report with the first and second temperatures to the UE or cloud computing device to perform acts 806-812. As such, the UE or the cloud computing device can transmit and the measurement device can receive an indication to obtain the first and second temperatures after act 810 when the measurement device is not at an appropriate temperature for thermal property measurements.

Figure 9:
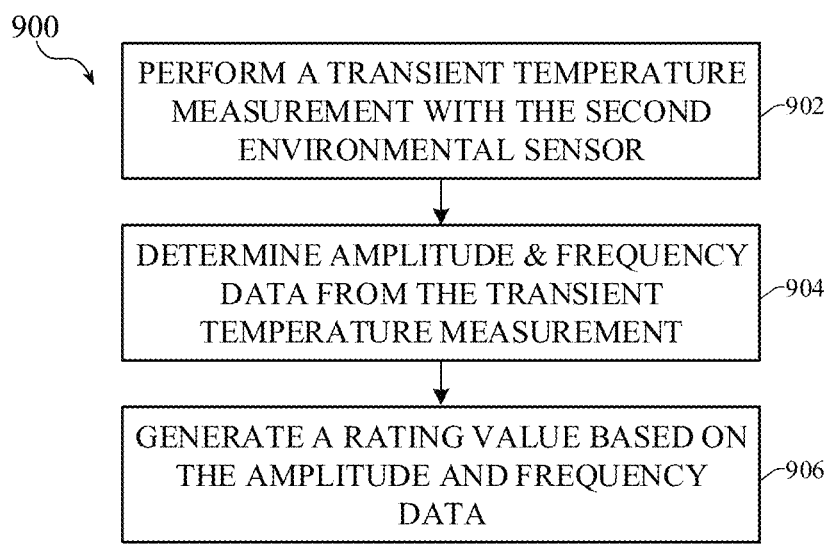
FIG. 9 shows a flow diagram of a method for determining if a sleep environment is suitably healthy based on one or more of temperature or humidity.

FIG. 9 shows a flow diagram of a method 900 for determining if a sleep environment is suitably healthy based on one or more of temperature or humidity. In some examples, the measurement device is the measurement device 100 of FIG. 7 and a device of the measurement system (e.g., measurement system 100A of FIG. 1A) can be configured to perform method 900.

At 902 the method includes performing a transient temperature measurement with the second environmental sensor (e.g., second environmental sensor 114 of FIG. 7). The transient temperature measurement can be performed over a predetermined period sufficient to characterize one or more of the temperature, humidity, and fluctuations of temperature and humidity of the sleeping environment over time.

At 904, the method includes determining one or more of amplitude data and frequency data from the transient temperature measurement. The amplitude and frequency data can indicate how environmentally stable the sleeping environment is, or how drafty the sleeping environment is.

At 906, the method includes generating a rating value based on the amplitude and frequency data. The rating value indicates temperature and/or humidity variations of the second environmental sensor over the predetermined period. That is, the rating value can be based on a deviation of the amplitude data and/or a deviation of the frequency data. For example, the rating value can be a rating between one and ten where a rating of one indicates the sleeping environment is not well suited to sleep because the sleeping environment is too drafty, to hot, or to cold. A rating of ten can indicate that the sleeping environment is stable and ideal for healthy sleep. In some embodiments, the rating value can indicate that the amplitude and frequency data satisfy a transient environmental threshold. For example, the transient environmental threshold could be a rating value of seven, and when the rating value is seven or higher, the transient environmental threshold is met, indicating the sleeping environment is satisfactory for healthy sleep.

It is also appreciated that acts 904-906 can be performed by any device of the measurement system. For example, the measurement device can perform all of method 900. In other examples, the measurement device can perform act 902, then transmit a measurement report with the transient measurement data to the UE or cloud computing device to perform acts 904-906. As such, the UE or the cloud computing device can transmit and the measurement device can receive an indication to re-obtain the transient temperature data after act 906 when the measurement device is not at an appropriate temperature for thermal property measurements.

Figure 10:
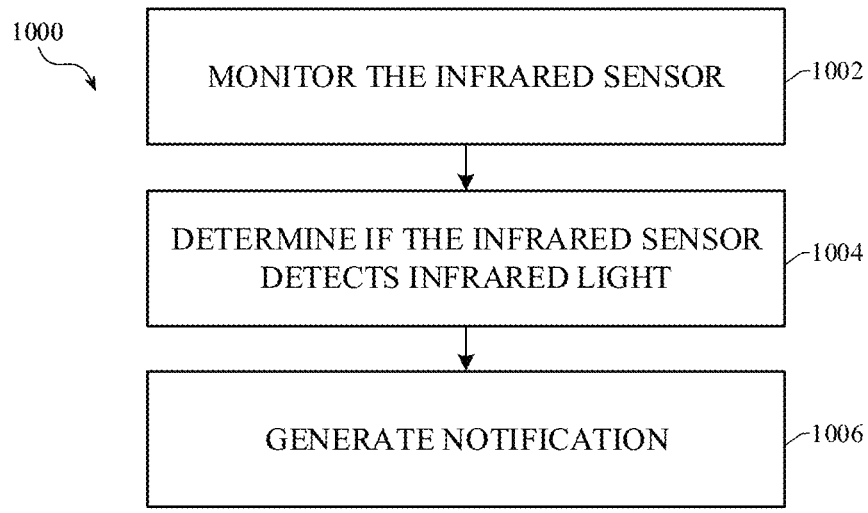
FIG. 10 shows a flow diagram of a method for determining if a sleep environment is suitable healthy based on lighting.

FIG. 10 shows a flow diagram of a method 1000 for determining if a sleep environment is suitable healthy based on lighting. In some examples, the measurement device is the measurement device 100 of FIG. 6A-6C or 7 and a device of the measurement system (e.g., measurement system 100A of FIG. 1A) can be configured to perform method 1000.

At 1002, the method includes monitoring one or more of the infrared sensor (e.g., first infrared sensor 304 or second infrared sensor 308 of FIG. 6A-6C or 7). As the method includes monitoring for infrared light that passes through the housing, an infrared emitter (e.g., infrared emitter 302 of FIG. 6A-6C or 7) can be configured for no transmissions so as not to incidentally create a false positive event where the infrared sensor detects light from the infrared emitter rather than an external light source.

At 1004, the method includes determining if the one or more infrared sensors detect infrared light. For example, the one or more infrared sensors can detect residual light (e.g., residual light 704 of FIG. 7) that passes through the housing from an exterior light source (e.g., exterior light source 702). As the housing material can be minimally transparent, or substantially opaque, any light that passes through the housing and detected by the infrared sensor can be indicative of a sleep environment that is too bright for healthy sleep. In some embodiments, the one or more infrared sensors detect a non-zero voltage, and the non-zero voltage indicates that the infrared sensor detected external infrared light. In other embodiments, the voltage of the one or more infrared sensors is compared to a voltage threshold, and when the voltage threshold is satisfied the method determines that external infrared light is detected. The voltage threshold can be a non-zero voltage threshold, and in response to determining the voltage exceeds the non-zero voltage threshold, a notification can be generated.

At 1006, the method includes generating a notification indicating that the infrared light is received from outside the housing in response to the one or more infrared sensors detecting infrared light. That is, the notification can be generated in response to a non-zero voltage detected by the one or more infrared sensors, or the voltage of the infrared sensor satisfying the voltage threshold.

It is also appreciated that acts 1004-1006 can be performed by any device of the measurement system. For example, the measurement device can perform all of method 1000. In other examples, the measurement device can perform act 1002, then transmit a measurement report with the infrared data to the UE or cloud computing device to perform acts 1004-1006. As such, the UE or the cloud computing device can transmit and the measurement device can receive an indication to re-obtain infrared data after act 1006 when the measurement device should continue monitoring for external light.

It is appreciated that methods 400, 800, 900 and 1000 can be performed by the devices of the measurement system 100A of FIG. 1A. Furthermore, it is appreciated that the methods 400, 800, 900, and 1000 can be performed in conjunction with one another. For example, method 800 can be performed to determine if the measurement device is ready for use, and subsequently method 400 can be performed to determine the thermal property of a material sample. Methods 900 and 1000 can be performed individually or in combination to determine if the sleep environment is suitable for healthy sleep. For example, the circuitry performing the methods can indicate the suitability of the sleep environment for healthy sleep based on a combination of methods 900 and 1000.

Material Recommendation Based on Environmental Factors

In some aspects, a device of the measurement system (e.g., measurement system 100A of FIG. 1A) can be used to identify a set of materials and associated material properties, such as thermal properties. For example, the measurement device can be used to measure properties of a wardrobe of clothing, a set of infant clothing, blankets for adults (collectively referred to as garments), or the like, and record the identified set of materials and associated material properties. Once a device of the measurement system has a database of identified materials, the device can recommend a material or garment based on environmental factors. For example, a database of measured garments or garment usage characteristics can be stored and retrieved from the cloud computing device.

Figure 11:
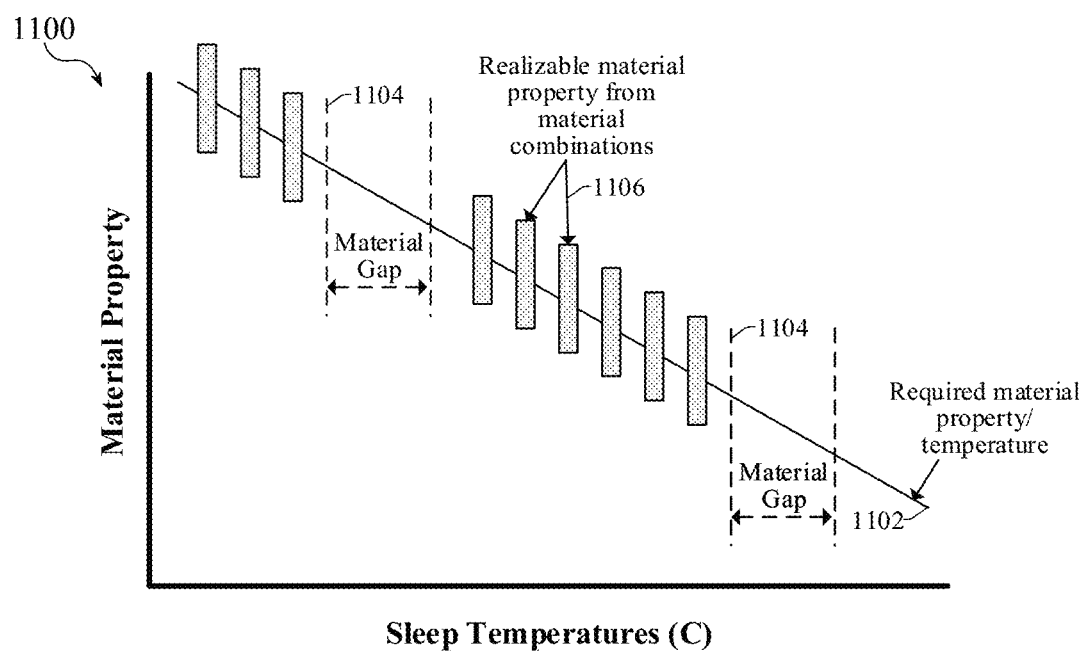
FIG. 11 shows a graph of material combinations for different temperatures.

FIG. 11 shows a graph 1100 of material combinations for different temperatures. The horizontal axis is temperature is in Celsius, and the vertical axis is the material property (e.g., thermal property). The graph 1100 shows a line 1102 that represents the required material property per temperature, for example, the required thermal property of a garment to realize healthy sleep.

In some embodiments the device may have identified the set of materials including a first material, a second material, and a third material. The device can determine which of the set of materials can be combined or used individually for healthy sleep. Material combinations 1106 represent a combination of the set of materials that provide an acceptable material property (e.g., thermal property) at a given temperature.

As such, the measurement device can measure an environmental factor of the sleep environment by a second environmental sensor (e.g., second environmental sensor 114 of FIG. 7). Based on the environmental factor, for example, temperature or humidity, the device of the measurement system can determine and report a suggested one or more materials from the set of materials. For example, the measurement device can measure a first temperature and a device can determine that the first material satisfies the required material property of the first temperature. In another example, the measurement device can measure a second temperature and a device of the measurement system can determine that the second material and the third material, in combination, realize the required material property of the second temperature. After determining the material combination 1106, the device can generate a notification of which of the set of materials should be combined for use. As such, the measurement device can be used to measure materials such as garments and a device of the measurement system can suggest a particular set of garments for healthy sleep. Additionally, or alternatively, the measurement device can be used to measure materials such as blankets and a device of the measurement system can suggest a particular set of blankets for healthy sleep or preferred comfort for sleep. For example, the device can receive preference data for comfort based on user inputs to learn a particular person's comfort criteria for sleep, and use the preference data in suggesting blankets for a given temperature. In some examples, the preference data can be stored in and retrieved from the cloud computing device.

In other embodiments, the device may determine that there is no combination or individual material that satisfies the required material property for a temperature. For example, there may be no known combination or individual material to satisfy a required material property for a specific season or temperature that has not yet been encountered by the measurement device. Where no combination of materials exists for a temperature or a season, a material gap 1104 exists. In these examples, the device can generate a notification that no measured material combination exists and can recommend an appropriate material for the user. For example, a caregiver can measure all the purchased garments for a baby. The device can determine that there is no combination or individual garments that satisfies the thermal properties for healthy sleep for a particular temperature and identify the material gap 1104. In response to determining the material gap 1104, the device can generate a report with recommend suitable garments that will provide the required material property at the particular temperature. In other embodiments, the device can generate a report with recommended suitable garments for blankets, clothing for outdoors, or the like. As such, the device can be used to recommend suitable materials for environmental factors and identify gaps in materials for environmental factors.

It is appreciated that aspects discussed in accordance with FIG. 11 can be performed by any device of the measurement system. For example, the measurement device can perform all aspects described in FIG. 11. In other examples, the measurement device can perform measurement functions associated with FIG. 11 (e.g., measurement data for characterizing a garment), then transmit a measurement report with the measurement data to the UE. The UE can determine thermal properties or garments based on the measurement data and catalog the data in the UE or transmit the cataloged data to the cloud computing device. The UE can also perform aspects related to determining material combinations 1106 and identifying material gaps 1104. Furthermore, the UE can suggest garments for the material gaps 1104 based on database information obtained from the cloud computing device.

The present disclosure is described with reference to the attached figures, wherein like reference numerals are used to refer to like elements throughout, and wherein the illustrated structures and devices are not necessarily drawn to scale. As utilized herein, terms "module," "component," "system," "circuit," "element," "slice," "circuitry," and the like are intended to refer to a set of one or more electronic components, a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuits can reside within the same circuitry, and circuitry can be localized on one computer and/or distributed between two or more computers. A set of elements or a set of other circuits can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. In another example, circuitry can be an apparatus that provides specific functionality through electronic components without mechanical parts; the electronic components can include one or more processors therein to execute executable instructions stored in computer readable storage medium and/or firmware that confer(s), at least in part, the functionality of the electronic components.

It will be understood that when an element is referred to as being "connected" or "coupled" to another element, it can be physically connected or coupled to the other element such that current and/or electromagnetic radiation or energy (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

As used herein, a signal that is "indicative of" a value or "corresponding to" other information may be a digital or analog signal that encodes or otherwise communicates the value or other information in a manner that can be decoded by and/or cause a responsive action in a component receiving the signal. The signal may be stored or buffered in computer readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

As used herein, "determine" or "determining" some quantity or characteristic is to be construed in non-limiting manner to include directly or indirectly measuring, estimating, calculating, reading data from storage medium, approximating, receiving data from another component, identifying, receiving a signal from a measurement device, computing, and so on. The function of determining may be performed by circuitry or hardware components and/or computer-executable instructions in execution by a processor or device.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring to the transmit signal in baseband, intermediate, and radio frequencies.

Use of the word example is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It can be seen from the foregoing description that the described methods, circuitries, and devices provide a household suitable handheld and portable measurement device that determines a thermal property of material and, in some examples, determine and display a suitability of the material for the present environment.

Examples can include subject matter such as a method, means for performing acts or blocks of the method, at least one machine-readable medium including instructions that, when performed by a machine cause the machine to perform acts of the method or of an apparatus or system for measuring a thermal property of a material sample according to embodiments and examples described herein.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. The various illustrative logics, logical blocks, modules, and circuits described in connection with aspects disclosed herein can be implemented or performed with a general purpose processor executing instructions stored in computer readable medium.

While the embodiments have been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the embodiments discussed herein. The above description of illustrated embodiments of the subject disclosure is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application. The use of the phrase "one or more of A, B, or C" is intended to include all combinations of A, B, and C, for example A, A and B, A and B and C, B, and so on.

In various embodiments, the present application provides method for a measurement system, the method comprising: receiving a measurement report including acoustic data, wherein acoustic data is based on an acoustic signal received through a material sample; determining a first thermal property value of the material sample based on the acoustic data of the measurement report; and generate an indication of the first thermal property value.

In various embodiments, the present application provides a measurement device comprising: a first member; a second member rotatably coupled to the first member at a pivot that affixes the first member to the second member; an infrared emitter disposed within the first member facing the second member; an acoustic emitter disposed within the first member facing the second member; an infrared sensor disposed within the second member facing the first member; an acoustic receiver disposed within the second member facing the first member; and a transceiver circuitry configured to transmit a measurement report.

In various embodiments, the present application provides a device comprising: a memory interface; one or more processors communicatively coupled to the memory interface, the one or more processors configured to: receive a measurement report including acoustic data, infrared data, and thickness data associated with a material sample; determine a thermal property value of the material sample based on the infrared data, the acoustic data, and the thickness data; and report the thermal property value.

In various embodiments, the present application provides a measurement device comprising: a first member; a second member rotatably coupled to the first member at a pivot that affixes the first member to the second member, the first member and the second member configured to pivot between a closed position, wherein the first member and the second member contact one another, and an open position wherein the first member is rotatably separated from the second member; an infrared emitter disposed within the first member, the infrared emitter facing the second member; and a infrared sensor disposed within the second member facing the first member, wherein when the first member and the second member are in the closed position, the infrared emitter and the infrared sensor are misaligned.

In various embodiments, the present application provides a measurement device comprising: a transceiver; a first member; a second member rotatably coupled to the first member at a pivot that affixes the first member to the second member, the first member and the second member configured to pivot between a closed position, wherein the first member and the second member contact one another, and an open position wherein the first member is rotatably separated from the second member; a infrared emitter disposed within the first member; a infrared sensor disposed within the second member, wherein the infrared emitter and infrared sensor are misaligned in the closed position; and a measurement and analysis circuitry disposed within one of the first member or the second member and configured to control the infrared emitter and the infrared sensor.

In various embodiments, the present application provides a device comprising: a memory interface; one or more processors communicatively coupled to the memory interface, the one or more processors configured to: receive a measurement report from a measurement device, the measurement report including infrared data indicative of infrared light received by an infrared sensor of the measurement device when an infrared emitter of the measurement device is not emitting an infrared signal; determine, from the infrared data, that infrared light was received from outside of the measurement device; and generate a notification indicating that the infrared light was received from outside of the measurement device in response to the determination.

In various embodiments, the present application provides a measurement device comprising: a housing, the housing comprising: a first member and a second member, wherein the first member and the second member are attached to one another by a clamping mechanism; a handle mechanism connected to the clamping mechanism, wherein the clamping mechanism is between the handle mechanism and the first and second members, wherein the handle mechanism has a first handle portion arranged over a second handle portion, and the first handle portion is separated from the second handle portion by a gap; a first environmental sensor disposed within one of the first member or the second member; and a second environmental sensor disposed within or protruding from the housing.

In various embodiments, the present application provides a measurement device comprising: a housing, the housing comprising: a handle mechanism with a first handle portion separated from a second handle portion by a gap; a set of clamping jaws; a first environmental sensor disposed within one of the set of clamping jaws; and a second environmental sensor separated from the first environmental sensor; a circuitry disposed within the housing configured to: obtain a first temperature from the first environmental sensor; obtain a second temperature from the second environmental sensor; and control operation of the measurement device based on the first temperature and the second temperature.

In various embodiments, the present application provides a device comprising: a memory interface; one or more processors communicatively coupled to the memory interface, the one or more processors configured to: receive a measurement report, wherein the measurement report includes first temperature data indicative of an internal temperature of measurement device and second temperature data indicative of an external temperature proximate the measurement device; determine that a temperature difference between the first temperature data and the second temperature data is below a threshold; and in response, generate a notification indicating that the measurement device is ready for use.

What is claimed is:

1. A measurement device comprising:
a first member;
a second member rotatably coupled to the first member at a pivot that affixes the first member to the second member,
the first member and the second member configured to pivot between a closed position, wherein the first member and the second member contact one another, and an open position wherein the first member is rotatably separated from the second member;
an infrared emitter disposed within the first member, the infrared emitter facing the second member; and
an infrared sensor disposed within the second member facing the first member, wherein when the first member and the second member are in the closed position, the infrared emitter and the infrared sensor are misaligned.

2. The measurement device of claim 1, wherein when the first member and the second member are in the closed position, the infrared emitter and the infrared sensor are misaligned at an oblique angle with respect to a normal line of a surface of the infrared sensor that faces the first member.

3. The measurement device of claim 1, wherein the infrared emitter is over the infrared sensor, and the infrared emitter is laterally offset from the infrared sensor.

4. The measurement device of claim 1, wherein in the open position, the infrared emitter and the infrared sensor are aligned.

5. The measurement device of claim 4, wherein the open position is defined by a maximum rotatable angle between the first member and the second member, and the infrared emitter is oriented substantially normal to the infrared sensor.

6. The measurement device of claim 1, wherein the infrared emitter and the infrared sensor are aligned in the open position; and
the infrared emitter and the infrared sensor are more aligned at a rotatable angle between the closed position and the open position relative to the misalignment in the closed position.

7. The measurement device of claim 1, wherein the first member and the second member comprise a material that passes infrared light from an external surface of the first and second members to an internal surface of the first and second members.

8. A measurement device comprising:
a transceiver;
a first member;
a second member rotatably coupled to the first member at a pivot that affixes the first member to the second member,
the first member and the second member configured to pivot between a closed position, wherein the first member and the second member contact one another, and an open position wherein the first member is rotatably separated from the second member;
an infrared emitter disposed within the first member;
an infrared sensor disposed within the second member, wherein the infrared emitter and infrared sensor are misaligned in the closed position; and
a measurement and analysis circuitry disposed within one of the first member or the second member and configured to control the infrared emitter and the infrared sensor.

9. The measurement device of claim 8, wherein the measurement and analysis circuitry is configured to:
configure the infrared sensor for reception;
generate infrared data from the infrared sensor; and
transmit, by the transceiver, a measurement report indicative of the infrared data.

10. The measurement device of claim 9, wherein the measurement and analysis circuitry is further configured to configure the infrared emitter for no transmissions while the measurement and analysis circuitry generates infrared data from the infrared sensor.

11. The measurement device of claim 10, wherein the infrared sensor is a first infrared sensor and the measurement device further comprises:
a second infrared sensor disposed within the second member adjacent to the first infrared sensor, and the infrared data is generated from one or more of the first infrared sensor or the second infrared sensor.

12. The measurement device of claim 9, wherein the infrared emitter and the infrared sensor are misaligned at an oblique angle.

13. The measurement device of claim 9, wherein the infrared emitter and the infrared sensor are laterally offset from one another.

14. The measurement device of claim 9, wherein in the open position, the infrared emitter and the infrared sensor are aligned and oriented angularly normal with respect to one another.

15. The measurement device of claim 8, wherein the measurement and analysis circuitry is configured to:
control the infrared emitter to transmit an infrared signal from the infrared emitter through a material sample clamped between the first member and the second member;
control the infrared sensor to receive the infrared signal at the infrared sensor; and
generate infrared data based on the received infrared signal at the infrared sensor; and
transmit a measurement report that includes the infrared data.

16. A device comprising:
a memory interface;
one or more processors communicatively coupled to the memory interface, the one or more processors configured to:
receive a measurement report from a measurement device, the measurement report including infrared data indicative of infrared light received by an infrared sensor of the measurement device when an infrared emitter of the measurement device is not emitting an infrared signal;
determine, from the infrared data, that infrared light was received from outside of the measurement device; and
generate a notification indicating that the infrared light was received from outside of the measurement device in response to the determination.

17. The device of claim 16, wherein the infrared data indicates a voltage detected by the infrared sensor; and
wherein the one or more processors are configured to determine that the infrared light was received from outside of the measurement device in response to the infrared data indicating a non-zero voltage.

18. The device of claim 17, wherein the one or more processors are configured to determine that the infrared light was received from outside the device in response to the infrared data indicating the voltage above a non-zero voltage threshold; and
generate the notification in response to determining the voltage exceeds the non-zero voltage threshold.

* * * * *